(12) United States Patent
Uchida et al.

(10) Patent No.: US 7,319,496 B2
(45) Date of Patent: Jan. 15, 2008

(54) SIGNAL PROCESSING APPARATUS, IMAGE DISPLAY APPARATUS AND SIGNAL PROCESSING METHOD

(75) Inventors: Masaki Uchida, Chiba (JP); Hiroshi Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 11/007,921

(22) Filed: Dec. 9, 2004

(65) Prior Publication Data
US 2005/0140829 A1 Jun. 30, 2005

(30) Foreign Application Priority Data
Dec. 12, 2003 (JP) ............................... 2003-415003

(51) Int. Cl.
*H04N 5/208* (2006.01)
(52) U.S. Cl. .................................................... 348/625
(58) Field of Classification Search ................ 348/625, 348/615, 607, 26, 666, 628, 606, 252; 382/266, 382/199, 275; 345/697, 600
See application file for complete search history.

(56) References Cited

U.S. PATENT DOCUMENTS

| | | | | |
|---|---|---|---|---|
| 4,733,300 A | * | 3/1988 | Sugiyama et al. | 348/448 |
| 4,918,528 A | * | 4/1990 | Oohashi | 348/625 |
| 5,561,473 A | * | 10/1996 | Saionji et al. | 348/628 |
| 5,731,845 A | * | 3/1998 | Kashimura | 348/630 |
| 5,966,461 A | * | 10/1999 | Harrington | 382/167 |
| 6,052,491 A | * | 4/2000 | Clatanoff et al. | 382/275 |
| 6,091,396 A | * | 7/2000 | Minami et al. | 345/690 |
| 6,424,383 B1 | * | 7/2002 | Terai et al. | 348/628 |
| 6,618,097 B1 | * | 9/2003 | Yamada | 348/625 |
| 6,661,469 B1 | * | 12/2003 | Kawabata et al. | 348/607 |
| 6,958,760 B1 | * | 10/2005 | Kim | 345/697 |
| 7,209,182 B2 | * | 4/2007 | Kawabata et al. | 348/607 |
| 7,224,405 B2 | * | 5/2007 | Taguchi et al. | 348/607 |
| 2004/0113901 A1 | * | 6/2004 | Kawahara | 345/204 |

FOREIGN PATENT DOCUMENTS

JP 2002077668 * 3/2002

* cited by examiner

*Primary Examiner*—Paulos M. Natnael
(74) *Attorney, Agent, or Firm*—Frommer Lawrence & Haug LLP; William S. Frommer

(57) ABSTRACT

There is provided a signal processing apparatus comprises an edge amount detection portion for generating a data string of luminance differences of a pair of pixels adjacent to each other or adjacent over some pixels in predetermined number of frames of a luminance signal, detecting a maximum luminance difference from the data string and storing the same; and a correction amount conversion portion for converting the data string of the luminance difference to a contour correction amount based on the maximum luminance value: wherein a correction signal generation portion generates a contour correction signal while changing a gain in accordance with the contour correction amount and outputs the same to a contour correction portion; and the contour correction portion adds the contour correction signal to an image signal by synchronizing, corrects a contour of the image and output the same.

15 Claims, 12 Drawing Sheets

SIGNAL PROCESSING APPARATUS, IMAGE DISPLAY APPARATUS AND SIGNAL PROCESSING METHOD

BACKGROUND OF THE INVENTION

1. Field of the Invention

The present invention relates to a signal processing apparatus and the method for performing contour correction adaptable to a frequency band of luminance of an image, and an image display apparatus using the signal processing apparatus.

2. Description of the Related Art

As one of image processing, there is known contour correcting processing for correcting to a clear image by enhancing a contour of an image with an indistinct contour or blurring a contour of an image with a harsh contour to some extent. As one kind of contour correction, for example, in order to improve sharpness of an image on a display of a television set, etc., contour enhancing processing for enhancing high frequency characteristics by extracting high frequency components of a video signal by filtering processing, giving a suitable gain and adding the same to the original video signal is general.

When contour enhancement is visually recognized, sharpness of an edge portion composing the contour in an image is determined in accordance with an amount of enhancement (a gain of a correction amount), on the other hand, it is necessary to prevent a portion around the contour from becoming unnatural due to excessive contour enhancement on the portion around the edge portion. On an object of preventing such unnaturalness, the present inventors have already proposed a video signal processing apparatus, wherein a suitable filter coefficient is calculated in accordance with a luminance difference of adjacent pixels, so that a bandwidth (for example, a half bandwidth) of a bandpass filter and a center frequency to be corrected can be changed, and a gain of a contour correction signal output from the filter in accordance with the luminance difference can be adjusted. The video signal processing apparatus is described in The Japanese Unexamined Patent Publication No. 2000-013642 (the patent article 1).

This technique is, as described in the patent article 1, to determine whether an image of a scene to be subjected to contour correction includes high frequency components or not based on whether a luminance difference of adjacent pixels exceeds, for example, a certain threshold or not in an image (input image) of a specific resolution to be subjected to processing by a color signal processing apparatus, such as a video camera, and to change filter characteristics and gains in accordance with the determined result.

In a field of a display apparatus in recent years, a display unit, such as a display panel, have become higher in resolution, and an input image adapted to the display resolution can be sufficiently clearly displayed, so that the case of not requiring contour correction has increased. On the other hand, there is a demand for contour correction adaptable to a variety of image signals output from various kinds of apparatuses and having different standards on resolution, etc. and different frequency bands.

A variety of signals, such as a standard-definition (SD) image, a high-definition (HD) image, a broadcast image wherein sharpness changes in accordance with a signal path, high quality image of a digital versatile disk (DVD), etc., and an image mixed with graphics from a Set Top Box (STB), etc. are input from a variety of input terminals to a processing block for performing image signal processing on sharpness, etc.

As a method of determining a signal type in the processing block, a method of determining by from which input terminal the signal is input, and a method of determining by a frequency of a horizontal and vertical synchronization signals, etc. are common. Although, a signal type can be determined by that, it is difficult to also learn the frequency band of the signal precisely. For example, in the case where the input terminal is a D4 terminal, images with different resolutions, such as an SD image and HD image, are input, so that the signal band cannot be determined based only on the input terminal. It is also the same in an RCA terminal. Also, when determining by a synchronization signal frequency of an input signal, a signal bandwidth cannot be determined only by a frequency of a synchronization signal because a signal bandwidth of a broadcast wave image passed through a variety of paths is different from that of a DVD image even if their frequencies of the synchronization signals are approximately same.

On the other hand, in a recent display apparatus on the basis that a variety of types and resolutions of images are input, a function of adapting an input image to a resolution of the display portion by enlargement scaling by performing interlace progressive conversion (IP conversion) is provided. In this case, as a result that data is newly created between pixel data of original input image with a low resolution by interpolation processing at the time of enlargement scaling to adapt the image to a display portion of a high resolution, a contour of the image is liable to blur. In this point, contour enhancement becomes necessary, and a recent display apparatus is provided with a signal processing apparatus (signal processing IC) having a function of contour enhancement in a processing block after IP conversion.

There is a case where even when an image input to the contour enhancement processing block is input, for example, from a D terminal and a signal frequency after IP conversion is equivalent to that of an HD image, the image at the time of being input and before the IP conversion is an SD image. Therefore, even when determining by combining determination by an input terminal and by synchronization signal frequency explained above, a frequency band of the signal cannot be correctly determined.

As explained above, when performing contour enhancement by a signal processing apparatus of the related art on the basis that a variety of signals are input, images having different frequency bands are input to the same input path of the contour enhancement processing block. In this case, contour enhancement is not necessary when both of the input image and display image are HD images or other high resolution images, but when the input image is an SD image and the display image is an HD image, sharpness of the image deteriorated by IP conversion, etc. has to be corrected by contour enhancement. However, in a current signal processing apparatus, a signal bandwidth cannot be determined due to the reason explained above, so that contour enhancement by a required amount adaptable to the signal bandwidth cannot be performed. Namely, in the case of setting a contour enhancement amount to a sufficient level for an image with a narrow frequency band so as to correct sharpness of the deteriorated image by IP conversion, when an image with a broad frequency band is input, the contour is excessively emphasized and the display image becomes harsh and poor. As a countermeasure thereof, it can be adjusted by a user, but the user has to understand relevance of a frequency band and contour enhancement, which is difficult and not realistic.

Next, an explanation will be made on the case of applying the technique described in the patent article 1 to contour enhancement of the signal processing apparatus on the basis that a variety of image signals are input.

A luminance difference of adjacent pixels is detected in the technique described in the patent article 1, but this is processing for determining whether a high frequency component of a certain value or higher is included or not as a reference for switching the filter characteristics and contour enhancement gains, but not for accurately detecting the signal bandwidth. Also in this case, a contour enhancement amount is switched in the case of including a high signal bandwidth to a certain degree, and in the case of a low signal bandwidth, but it is not possible to follow changes of a signal bandwidth of the input image, and sufficient accuracy cannot be obtained on setting a contour enhancement amount adaptable to the signal bandwidth.

Furthermore, there is a case where, for example, a contour enhancement amount is changed every time a scene of an image changes and a way of contour enhancement frequently changes on the display screen. In this case, it results in an even poorer display image.

SUMMARY OF THE INVENTION

An object of the present invention is to solve a disadvantage that, on the basis that a variety of image signals having different frequency bands are input, a highly accurate contour correction amount adaptable to the frequency band cannot be generated at suitable timing, and contour enhancement correction for displaying the input image clearly cannot be performed.

According to a first aspect of the present invention, there is provided a signal processing apparatus for correcting a contour of an image, comprising an edge amount detection portion for generating a data string of luminance differences of a pair of pixels adjacent to each other or adjacent over some pixels in predetermined number of frames composing the image, and detecting a maximum luminance difference from the data string and storing the same; a correction amount conversion portion for converting the luminance differences of the data string to a contour correction amount based on the maximum luminance difference; a correction signal generation portion for generating a contour correction signal while changing a gain in accordance with the contour correction amount; and a contour correction portion for adding the input contour correction signal to an image signal by synchronizing, and correcting a contour of the image.

According to the first aspect of the present invention, there is provided an image display apparatus for correcting a contour of an image by a signal processing circuit and sending to a display portion, wherein the signal processing circuit comprises an edge amount detection portion for generating a data string of luminance differences of a pair of pixels adjacent to each other or adjacent over some pixels in predetermined number of frames composing the image, and detecting a maximum luminance difference from the data string and storing the same; a correction amount conversion portion for converting the luminance differences of the data string to a contour correction amount based on the maximum luminance difference; a correction signal generation portion for generating a contour correction signal while changing a gain in accordance with the contour correction amount; and a contour correction portion for adding the input contour correction signal to an image signal by synchronizing, and correcting a contour of the image.

According to the first aspect of the present invention, there is provided a signal processing method for correcting a contour of an image, including a luminance difference generation step for generating a data string of luminance differences of a pair of pixels adjacent to each other or adjacent over some pixels in predetermined number of frames composing the image; an edge amount detection step for detecting a maximum luminance difference from the data string and storing the same; a correction amount conversion step for converting the luminance differences of the data string to a contour correction amount based on the maximum luminance difference; a correction signal generation step for generating a contour correction signal while changing a gain in accordance with the contour correction amount; and a contour correction step for adding the input contour correction signal to an image signal by synchronizing, and correcting a contour of the image.

According to a second aspect of the present invention, there is provided a signal processing apparatus for correcting a contour of an image, comprising an edge amount detection portion for generating a data string of luminance differences of a pair of pixels adjacent to each other or adjacent over some pixels from an image, comparing the luminance differences with a plurality of reference values, and detecting a range including a maximum luminance difference for every predetermined number of frames; a correction amount conversion portion for converting the luminance differences of the data string to a contour correction amount based on the detected range; a correction signal generation portion for generating a contour correction signal while changing a gain in accordance with the contour correction amount; and a contour correction portion for adding the input contour correction signal to an image signal by synchronizing, and correcting a contour of the image.

According to the second aspect of the present invention, there is provided an image display apparatus for correcting a contour of an image by a signal processing circuit and sending to a display portion, wherein the signal processing circuit comprises an edge amount detection portion for generating a data string of luminance differences of a pair of pixels adjacent to each other or adjacent over some pixels from the image, comparing the luminance differences with a plurality of reference values, and detecting a range including a maximum luminance difference for every predetermined number of frames; a correction amount conversion portion for converting the luminance differences of the data string to a contour correction amount based on the detected range; a correction signal generation portion for generating a contour correction signal while changing a gain in accordance with the contour correction amount; and a contour correction portion for adding the input contour correction signal to an image signal by synchronizing, and correcting a contour of the image.

According to the second aspect of the present invention, there is provided a signal processing method for correcting a contour of an image, including a luminance difference generation step for generating a data string of luminance differences of a pair of pixels adjacent to each other or adjacent over some pixels from the image; an edge amount detection step for comparing the luminance differences with a plurality of reference values, and detecting a range including a maximum luminance difference for every predetermined number of frames; a correction amount conversion step for converting the luminance differences of the data string to a contour correction amount based on the detected range; a correction signal generation step for generating a contour correction signal while changing a gain in accordance with the contour correction amount; and a contour correction step for adding the input contour correction signal to an image signal by synchronizing, and correcting a contour of the image.

According to a third aspect of the present invention, there is provided a signal processing apparatus for correcting a contour of an image, comprising an edge amount detection portion for generating a data string of luminance differences of a pair of pixels adjacent to each other or adjacent over some pixels in predetermined number of frames composing the image, comparing the luminance differences with a predetermined reference value, counting a number of luminance difference exceeding the predetermined reference value, and detecting a reference value close to a maximum luminance difference by repeating said comparison and counting while changing the predetermined reference value; a correction amount conversion portion for converting the luminance differences of the data string to a contour correction amount based on the detected reference value; a correction signal generation portion for generating a contour correction signal while changing a gain in accordance with the contour correction amount; and a contour correction portion for adding the input contour correction signal to an image signal by synchronizing, and correcting a contour of the image.

According to the third aspect of the present invention, there is provided an image display apparatus for correcting a contour of an image by a signal processing circuit and sending to a display portion, wherein the signal processing circuit comprises an edge amount detection portion for generating a data string of luminance differences of a pair of pixels adjacent to each other or adjacent over some pixels in predetermined number of frames composing the image, comparing the luminance differences with a predetermined reference value, counting a number of luminance difference exceeding the predetermined reference value, and detecting a reference value close to a maximum luminance difference by repeating the comparison and counting while changing the predetermined reference value; a correction amount conversion portion for converting the luminance differences of the data string to a contour correction amount based on the detected reference value; a correction signal generation portion for generating a contour correction signal while changing a gain in accordance with the contour correction amount; and a contour correction portion for adding the input contour correction signal to an image signal by synchronizing, and correcting a contour of the image.

According to the third aspect of the present invention, there is provided a signal processing method for correcting a contour of an image, including a luminance difference generation step for generating a data string of luminance differences of a pair of pixels adjacent to each other or adjacent over some pixels in predetermined number of frames composing the image, an edge amount detection step for comparing the luminance differences with a predetermined reference value, counting a number of luminance difference exceeding the predetermined reference value, and detecting a reference value close to a maximum luminance difference by repeating the comparison and counting while changing the predetermined reference value; a correction amount conversion step for converting the luminance differences of the data string to a contour correction amount based on the detected reference value; a correction signal generation step for generating a contour correction signal while changing a gain in accordance with the contour correction amount; and a contour correction step for adding the input contour correction signal to an image signal by synchronizing, and correcting a contour of the image.

In the above first to third aspects explained above, preferably, a sharpening filter for extracting edge information of the image in said correction signal generation portion, and an average luminance measuring portion for measuring an average luminance level in the predetermined number of frames are provided; and a filter coefficient of the sharpening filter is changed based on the average luminance level.

According to the first aspect of the present invention, when an input image signal is input to an edge amount detection portion, for example, a luminance difference between a pair of pixels adjacent to each other or adjacent over some pixels in one or some frames is calculated, and the maximum luminance difference is detected. In the present invention, the range of checking the maximum luminance difference is set to a predetermined number of frames. Also, a correction amount conversion portion converts a data string of luminance differences to a contour correction amount based on the maximum luminance difference. The maximum luminance difference is a parameter being substantially proportional to the highest frequency of a luminance in predetermined number of frames. Accordingly, a contour correction amount is set by depending on the maximum frequency of luminance.

A correction signal generation portion generates a contour correction signal by a sharpening filter for extracting a contour of an image signal by using a predetermined filter coefficient. At this time, a gain of the signal is changed in accordance with the contour correction amount. The generated contour correction signal is sent to a contour correction portion and added to the image signal. At this time, since the gain of the contour correction signal can be changed for every predetermined number of frames, the contour correction signal is input to the contour correction portion by being in synchronization within every predetermined number of frames for the image signal. Therefore, the contour correction portion outputs an image signal subjected to contour correction in accordance with the maximum frequency of the luminance.

In an image display apparatus, an image signal after the contour correction is supplied to the display portion and a predetermined image is displayed on the display surface.

In the second and third aspects of the present invention, the maximum luminance difference itself is not obtained.

In the second aspect, a range including the maximum luminance difference is obtained. Namely, an edge amount detection portion compares luminance differences by using a plurality of reference values from a data string of measured luminance differences, and information on a rough distribution of degrees of the luminance differences is stored. In the degree distribution classified by the plurality of reference values, the largest range of luminance difference among ranges of that wherein at least one luminance value exists is obtained as a parameter regarding the highest frequency, and a contour correction signal is generated by using the same. After that, in the same way as in the first aspect, the contour correction signal and an image signal are synchronized and added, and the contour correction is completed.

In the third aspect, there is one reference value at the time of obtaining a range including the maximum luminance difference, and it is widely changed. At this time, a reference value at the time when a reference value exceeding the reference value first becomes zero or a reference value being smaller than the reference value by one step is the closest to the maximum luminance difference, and is determined as a parameter expressing the highest frequency of the luminance. After that, this parameter is used for generating a contour correction signal, and the contour correction signal and an image signal are synchronized and added, then, the contour correction is completed.

When an average luminance measurement portion is provided in the first to third aspects, an average luminance level is measured here. The measured average luminance level is input to the correction signal generation portion and supplied for generating or selecting of a filter coefficient of a sharpening filter for extracting edge information of the contour correction signal. Accordingly, a contour correction signal is generated by the sharpening filter for making an image clear in accordance with light and dark of the screen and used for contour enhancement.

According to the signal processing apparatus and an image display apparatus of the present invention, a maximum luminance difference is detected as a parameter for a highest frequency of luminance of an image signal, and a contour correction amount is determined in accordance with the maximum luminance difference, so that highly accurate contour correction becomes possible. Also, when an image signal having any resolution or bandwidth, wherein a frequency band of the luminance is different, is input, the highest frequency or a bandwidth of the luminance can be detected through the maximum luminance difference. Consequently, precise control becomes possible, such that a change rate of a contour correction amount for the luminance difference is changed, or contour correction is not performed on a signal having a certain bandwidth or more and contour correction is accurately performed on a signal having a narrower bandwidth than that in accordance with the maximum luminance difference.

Also, when detecting an average luminance level, in addition to the control of a contour correction amount in accordance with the above highest luminance difference, a coefficient of the sharpening filter can be changed based on the average luminance level. Accordingly, for example, thickness and steepness of the contour can be optimized in accordance with brightness of the overall screen.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Figure 1:
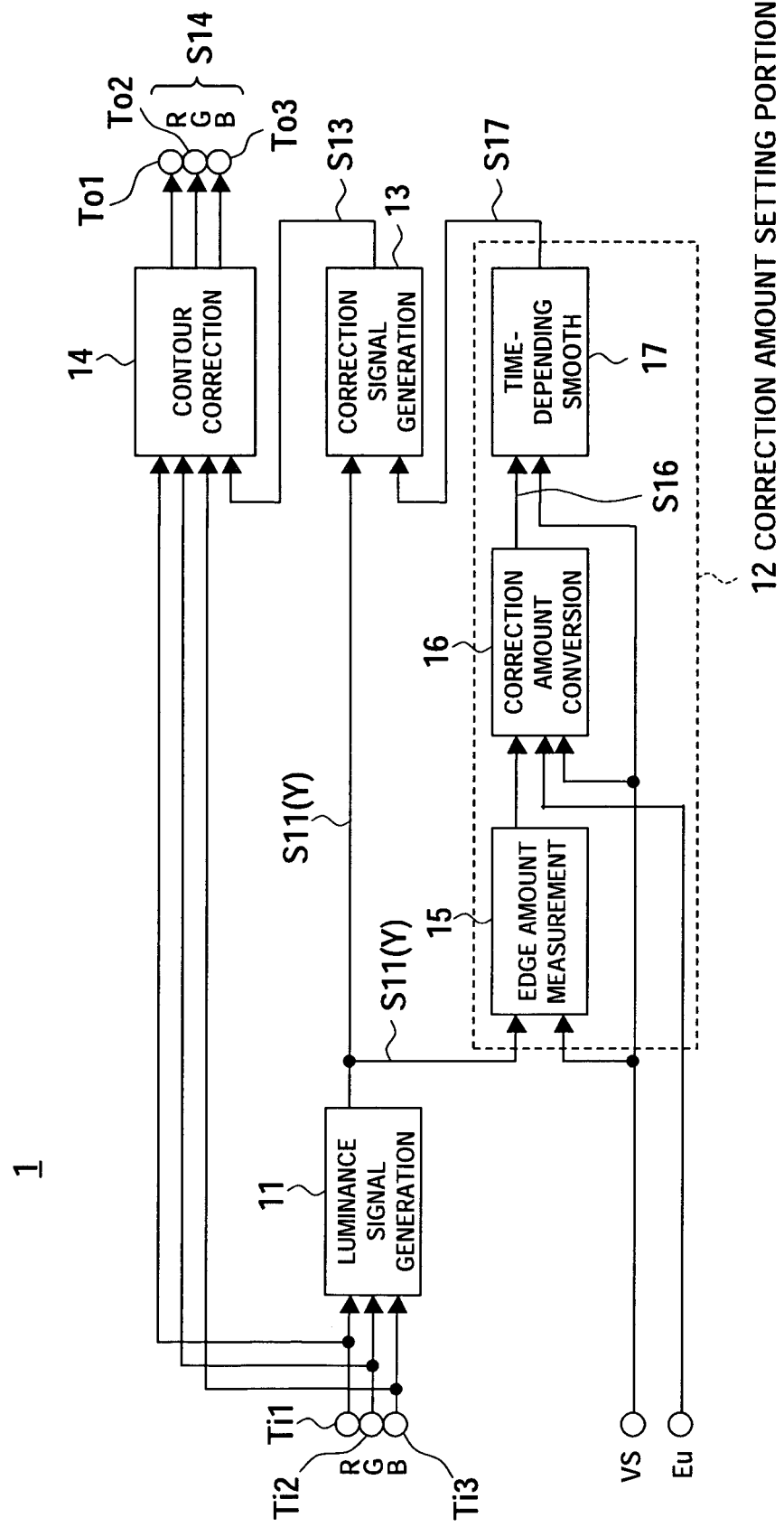
FIG. 1 is a view of the configuration of a signal processing apparatus according to an embodiment of the present invention.

FIG. 1 shows the configuration of a signal processing apparatus according to an embodiment of the present invention. The signal processing apparatus can be applied also to processing of blurring a contour of an image, but the case of performing contour enhancement correction will be taken as an example here. Note that the signal processing apparatus shown in FIG. 1 is capable of being embodied as a signal processing circuit in a display apparatus, and performs contour correction of an image to be supplied to a not shown display portion in that case.

The signal processing apparatus 1 comprises a luminance signal generation circuit 11, a correction amount setting portion 12 for setting a contour enhancement amount as a correction amount, a correction signal generation portion 13 for generating a contour correction signal, and a contour correction portion 14 for adding signals for contour enhancement.

The configuration may be realized only by hardware (circuit), and it is also possible to realize at least a part of a function of the correction amount setting portion 12 by software. Note that details of the case of software will be explained later on.

The luminance signal generation circuit 11 is connected to input terminals Ti1, Ti2 and Ti3, a red (R) signal, a green (G) signal and a blue (B) signal are respectively input as input image signals from the input terminals. The luminance signal generation circuit 11 generates a component signal (Y signal/color-difference signal) from the input R signal, G signal and B signal, separates the luminance (Y) signal S11 and supplies the same to the correction amount setting portion 12. The correction amount setting portion 12 performs time-depending smooth processing by obtaining a contour correction amount S16 from a luminance different of adjacent pixels based on the luminance signal S11, then, supplies a signal (hereinafter, referred to as a contour enhancement gain signal) S17 indicating a contour correction amount after the time-depending smoothing to the correction signal generation portion 13. The correction signal generation portion 13 receives as an input the luminance (Y) signal S11, extracts edge information by a sharpening filter from the luminance signal S11, and adjusts gains by the input contour enhancement gain signal S17 to generate a contour correction signal S13. The generated contour correction signal S13 is supplied to the contour correction portion 14. The contour correction portion 14 receives as an input the R signal, G signal and B signal as input image signals, and performs contour enhancement correction on the input image. At this time, a contour enhancement amount is determined by the input contour correction signal S13. The R signal, G signal and B signal after the contour enhancement (an RGB signal after contour enhancement) are respectively output from output terminals To1, To2 and To3 to a display portion of a not shown display apparatus, etc.

The correction amount setting portion 12 comprises an edge amount detection portion 15 for detecting an edge amount by measuring a luminance difference of a pair of pixels, a correction amount conversion portion 16 for converting an edge amount to a contour enhancement amount (correction amount), and a time-depending smooth portion 17 for averaging the correction amount in a predetermined time.

Here, the maximum value of the luminance difference of pixels or a luminance difference range including the maximum value is called "edge amount". The case of detecting the luminance difference range will be explained layer on. Here, the case of detecting the maximum luminance difference will be explained first. In this case, the edge amount detection portion 15 measures a luminance difference of adjacent pixels or a pair of pixels over one or more pixels based on the input image signal (luminance signal) S11, repeats the measurement in predetermined number of frames, and converts the luminance signal S11 to a data string composed of luminance differences, so that the maximum luminance difference is detected as an edge amount.

In the present invention, it is assumed that an arrangement direction of pixel pairs subjected to the luminance difference measurement, that is the measuring direction of the maximum luminance difference, is at least one of horizontal and vertical directions. At this time, it is necessary that the input luminance data is delayed for each pixel or each line. As a result that data input of the luminance signal S11 is made in unit of a horizontal line in time order, a circuit scale and time load of delay processing are required generally less in luminance difference measurement in the horizontal direction comparing with those in vertical direction luminance difference measurement. Accordingly, the edge amount detection portion 15 shown in FIG. 1 has the configuration of measuring luminance differences of pixel pairs in the horizontal direction and stores the maximum value (peak hold) of the luminance differences in predetermined number of frames. Note that the configuration of delaying pixel data (luminance data) both in the horizontal and vertical directions will be explained later on.

Figure 2:
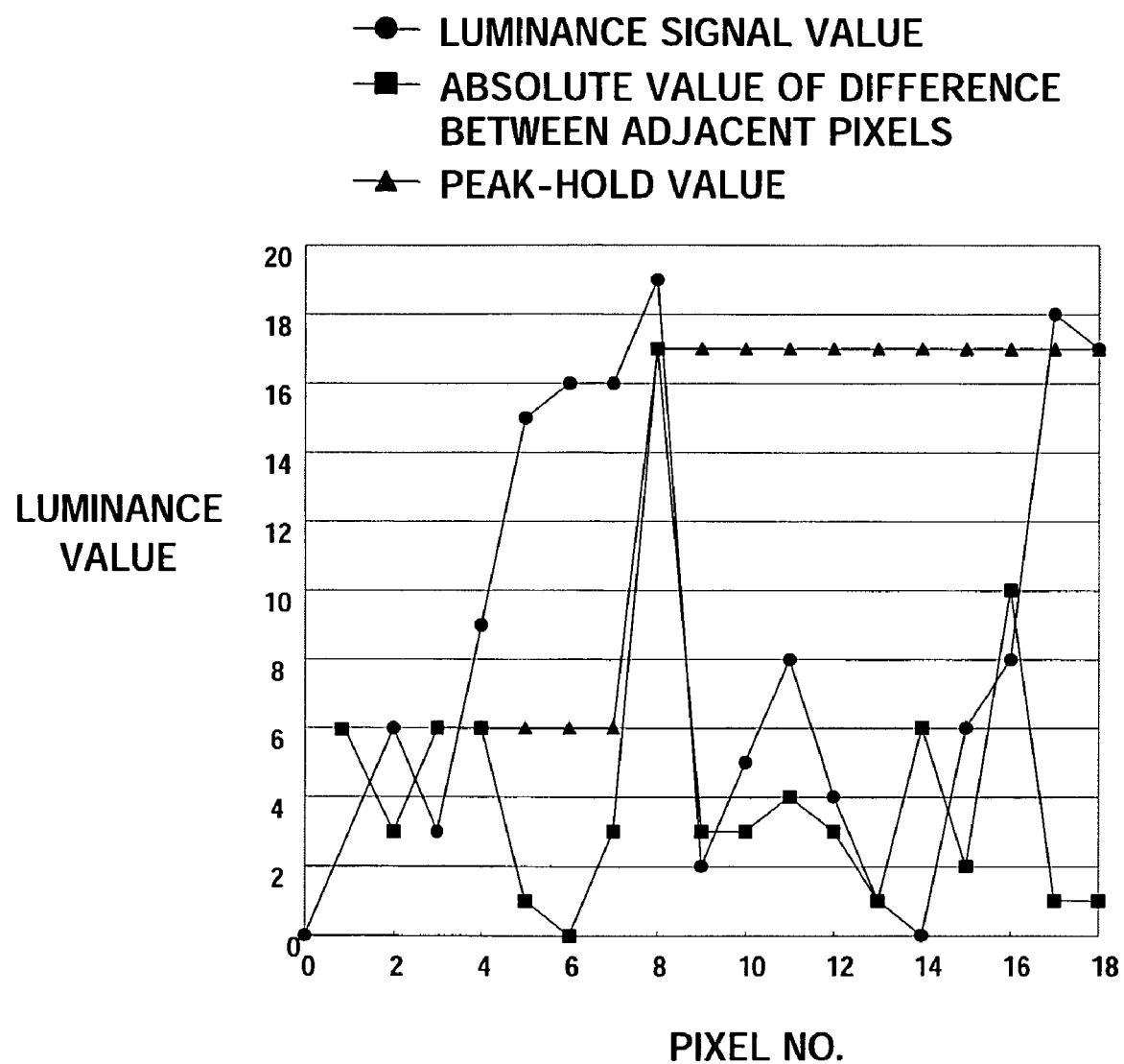
FIG. 2 is a graph for explaining an operation of an edge amount detection portion.

FIG. 2 is a graph for explaining an operation of the edge amount detection portion 15. An abscissa axis of the graph indicates numbers of pixels to be subjected to the processing from a point of a certain pixel on a horizontal line, and an ordinate axis indicates by a luminance value a luminance signal value, a luminance difference between adjacent pixels, and a peak-hold value of the luminance difference. An actual luminance value has a value of 0 to 255, for example, when luminance of respective color signals is prescribed by 8-bit tones, but a relative luminance value obtained by normalizing the maximum value by "20" is indicated here. In the graph, "a line connecting black circular marks" indicates luminance values regulated by the luminance signals, and "a line connecting black square marks" indicates absolute values of luminance differences in the horizontal direction. The maximum luminance difference to be obtained is measured by peak-holding the absolute values of the luminance differences. The peak-hold values are indicated by "black triangle marks" in FIG. 2 and, as shown by a line graph of the transition, the peak values exhibit tendency of gradually becoming larger as the pixel number becomes larger.

The edge amount detection portion 15 successively performs the operation shown in FIG. 2 on all pixels in predetermined number of frames, during one frame here. The peak value (maximum luminance value) is held until measurement of the next frame completes. The edge amount detection portion 15 has two functions: a function of converting a luminance signal to an absolute value of a luminance value difference between adjacent pixels and a function of detecting and holding the maximum luminance difference in one frame.

The correction amount conversion portion 16 is controlled its operation timing in accordance with an input of a vertical synchronization signal VS input from the outside. Namely, when the next vertical synchronization signal is input, edge amount detection (conversion to a luminance difference) on an amount of one frame performed up until then completes. At this time, a peak-hold value of the edge amount detection portion 15 is the maximum luminance difference in the frame, so that the peak-hold value is read at vertical synchronization timing and the luminance differences are successively converted to contour correction amounts based on the hold value. More specifically, the correction amount conversion portion 16 converts luminance differences between adjacent pixels input successively from the edge amount detection portion 15 to contour correction amounts S16 by multiplying the same with a coefficient set in accordance with the peak value (maximum luminance difference) in one frame.

Figure 3:
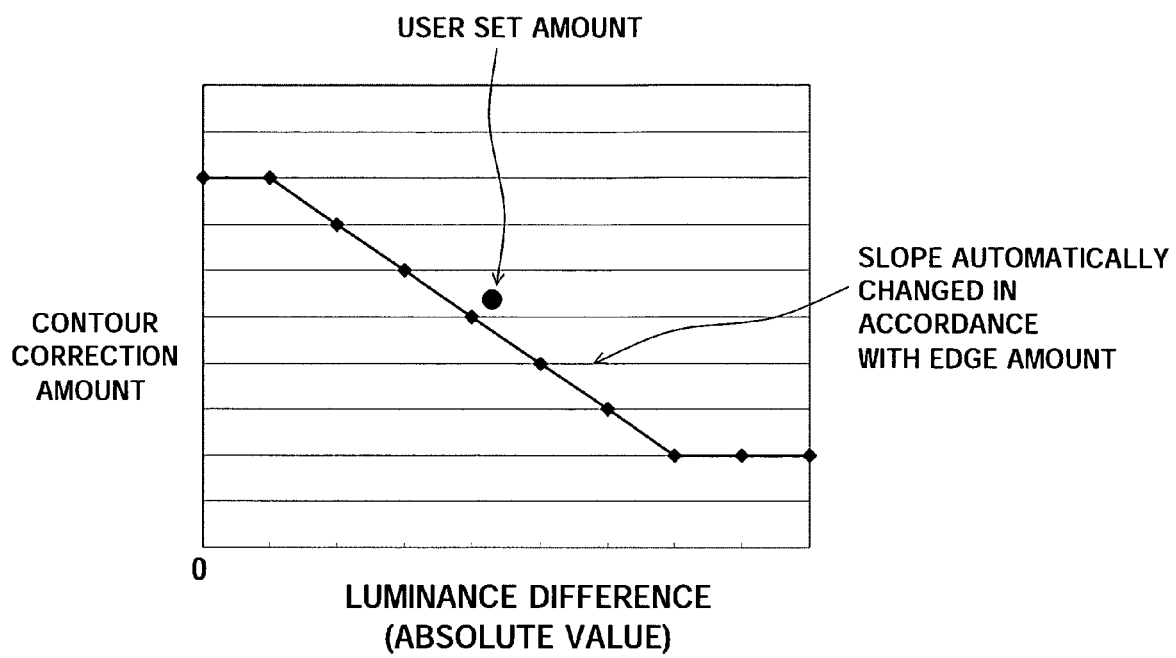
FIG. 3 is a graph of conversion characteristics of a correction amount conversion portion.

FIG. 3 shows conversion characteristics of the correction amount conversion portion 16. The conversion characteristics are an example of the case of controlling a contour correction amount by using the contour correction amount Eu input from the outside set by a user as a center value. When the user sets the contour correction amount Eu, conversion characteristics as shown in the figure is automatically set wherein this value is used as the center and a coefficient calculated from the detected peak value (maximum luminance difference) is the slope. Accordingly, contour correction amount is controlled so as to become small when the luminance difference between adjacent pixels measured by the edge amount detection portion 15 is large, while become a large value when the luminance difference is small.

Note that the conversion characteristic is what indicating the tendency that the slope is negative, and is not limited to that in the figure. In FIG. 3, the enhancement amount is limited, so that it does not change between the side with larger peak values and the side with smaller peak values, and the enhancement amount may be limited only on the side where the peak value is large or may be entirely a straight line without limits. Alternately, the enhancement amount may be nonlinearly changed with respect to the peak values.

Figure 4:
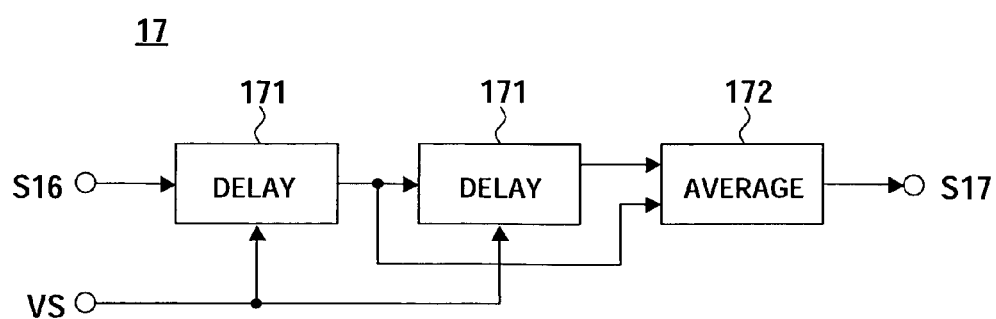
FIG. 4 is a view of the configuration of a circuit or software of a time-depending smooth portion.

FIG. 4 is an example of the configuration of a circuit or software of the time-depending smooth portion 17.

The time-depending smooth portion 17 comprises predetermined number of delay portions 171 and averaging portions 172 connected serially. The number of the delay portion 171 and the delay amount may be freely set, and two delay portions 171 of a delay amount of one frame are provided here. Contour correction amounts after delaying by an amount of one frame and after delaying by an amount of two frames are input to the averaging portion 172 and averaged by the averaging portion 172 to be a contour enhancement gain signal S17 and output. The two delay portions 171 are controlled by a vertical synchronization signal VS, and the contour enhancement gain signal S17 is a signal after being delayed by two frames from the input. As explained above, a period of one frame is required for edge amount measurement and correction amount conversion, respectively, so that an output of the correction amount setting portion 12 shown in FIG. 1 has a delay amount of four frames from the input. The delay amount can be freely set and can be changed by controlling the number of delay stages of the time-depending smooth portion 17. The contour enhancement gain signal S17 is supplied to the correction signal generation portion 13 shown in FIG. 1 as a signal in synchronization with the vertical synchronization signal VS.

Figure 5:
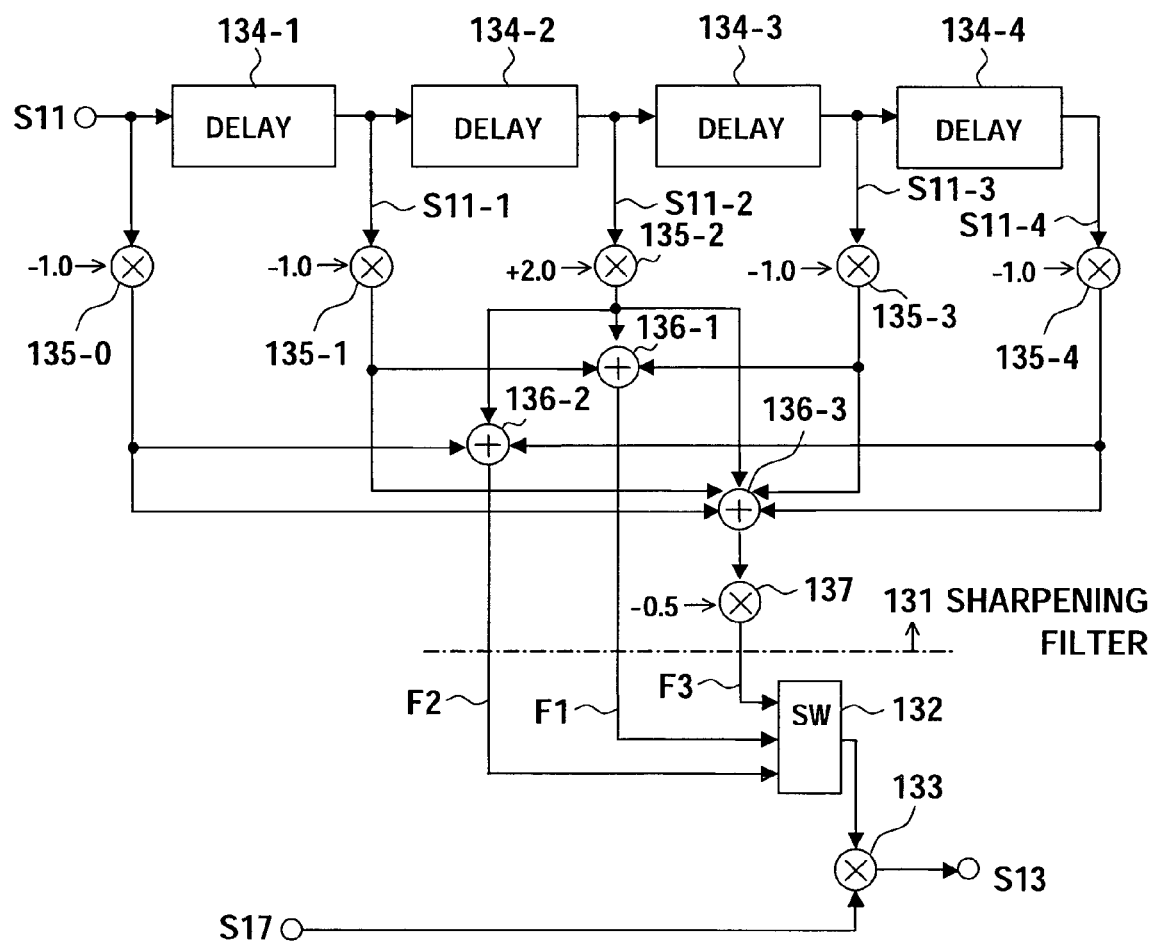
FIG. 5 is a view of the configuration of a correction signal generation portion.

FIG. 5 shows an example of the configuration of the correction signal generation portion 13.

The correction signal generation portion 13 comprises a sharpening filter 131 for receiving as an input a luminance signal S11 of an input image signal from the luminance signal generation circuit 11 shown in FIG. 1 and extracting edge information of the input image. The configuration of the sharpening filter may be any, and edge extraction being different by three filter coefficient set is performed here, and the result is output as filter outputs F1, F2 and F3. The three filter outputs F1 to F3 are input to the selection circuit (SW) 132, where any one of them is selected. The selected filter output is multiplied with an input contour enhancement gain signal S17 after being subjected to time-depending smoothing in the multiplier 133, as a result, a contour correction signal S13 is generated. The circuit shown in FIG. 5 including the multiplier operates in synchronization with a vertical synchronization signal, so that the generated contour correction signal S13 is also supplied as a signal in synchronization with the vertical synchronization signal to the contour correction portion 14 shown in FIG. 1.

The sharpening filter 131 comprises, as shown in FIG. 5, four delay portions 134-1, 134-2, 134-3 and 134-4 having a delay amount of one pixel, five coefficient multipliers 135-0, 135-1, 135-2, 135-3 and 135-4, three adders 136-1, 136-2 and 136-3 and one multiplier 137 for level adjustment.

The four delay portions 134-1 to 134-4 are serially connected, wherein an output of the luminance signal generation circuit 11 for outputting a luminance signal S11 shown in FIG. 1 is connected to an input terminal of the sharpening filter 131. Inputs on one side of the five coefficient multipliers 135-0, 135-1, 135-2, 135-3 and 135-4 are respectively connected to an input of the luminance signal S11, an output of the delay portion 134-1, an output of the delay portion 134-2, an output of the delay portion 134-3 and an output of the delay portion 134-4. Also, inputs on the other side of the five coefficient multipliers 135-0, 135-1, 135-2, 135-3 and 135-4 are connected to not shown means for generating or holding a coefficient, and their respective coefficient values "−1.0", "−1.0", "+2.0", "−1.0" and "−1.0" are input.

An input of the adder 136-1 is connected to outputs of three coefficient multipliers 135-1, 135-2 and 135-3. An input of the adder 136-2 is connected to outputs of three coefficient multipliers 135-0, 135-2 and 135-4. An input of the adder 136-3 is connected to outputs of five coefficient multipliers 135-0, 135-1, 135-2, 135-3 and 135-4. An output of the adder 136-3 is connected to an input on one side of the multiplier 137 and an input on the other side is supplied with a coefficient "−0.5". Outputs of the adders 136-1 and 136-2 and an output of the multiplier 137 are connected to an input of the selection circuit 132. An output of the selection circuit 132 is connected to an input on one side of the multiplier 133, and an input of the other side is connected to an output of the time-depending smooth portion 17 shown in FIG. 1. The generated contour correction signal S13 is supplied from the output of the multiplier 137 to the contour correction portion 14 shown in FIG. 1.

To obtain a first filter output F1 in the correction signal generation portion 13 configured as such, the input luminance signal S11 is delayed for three times by the delay portions 134-1 to 134-3 to generate a luminance signal S11-1 after being delayed once, a luminance signal S11-2 after being delayed twice, and a luminance signal S11-3 after being delayed for three times. These delayed luminance signals S11-1 to S11-3 are multiplied with coefficients "−1.0", "+2.0" and "−1.0" by the respectively corresponding coefficient multipliers 135-1 to 135-3, and input to the adder 136-1. As a result, edge information extracted from the input luminance signal S11 by a first filter characteristic is output as a first filter output F1 from the adder 136-1 and input to the selection circuit 132.

To obtain a second filter output F2, the input luminance signal S11 is delayed for four times by the delay portions 134-1 to 134-4 to generate a luminance signal S11-0 before being delayed, luminance signal S11-2 after being delayed twice, and a luminance signal S11-4 after being delayed for four times. These delayed luminance signals S11-0, S11-2 and S11-4 are multiplied with coefficients "−1.0", "+2.0" and "−1.0" by the respectively corresponding coefficient multipliers 135-0, 135-2 and 135-4, and input to the adder 136-2. As a result, edge information extracted from the input luminance signal S11 by a second filter characteristic being different from the above first filter characteristic is output as a second filter output F2 from the adder 136-2 and input to the selection circuit 132.

To obtain a third filter output F3, the input luminance signal S11 is delayed for four times by the delay portions 134-1 to 134-4 to generate a luminance signal S11-0 before being delayed, a luminance signal S11-1 after being delayed once, a luminance signal S11-2 after being delayed twice, a luminance signal S11-3 after being delayed for three times and a luminance signal S11-4 after being delayed for four times. These delayed luminance signals S11-0 to S11-4 are multiplied with coefficients "−1.0", "−1.0", "+2.0", "−1.0" and "−1.0" by the respectively corresponding coefficient multipliers 135-0 to 135-4, and input to the adder 136-3. As a result, edge information extracted from the input luminance signal S11 by a third filter characteristic being different from the above first and second filter characteristics is output as a third filter output F3 from the multiplier 137 and input to the selection circuit 132.

The selection circuit 132 selects any one of the first to third filer outputs F1 to F3, for example, by free selection by a user. The selected filter output is multiplied with the input contour enhancement gain signal S17 after time-depending smoothing, and after adjusting a gain of the filter output, it is output as a contour correction signal S13.

Note that setting of a delay amount and coefficient for determining the filter characteristics and the number of filter outputs may be any, and they are determined in accordance with resolution and specification of possible input image signals, for example, an SD signal, HD signal or DVD signal, etc. Also, it may be configured to control the selection circuit 132 in accordance with a contour enhancement gain signal S17 after time-depending smoothing. How different contour enhancement would be due to the difference of these filter characteristics will be explained later on.

Figure 6:
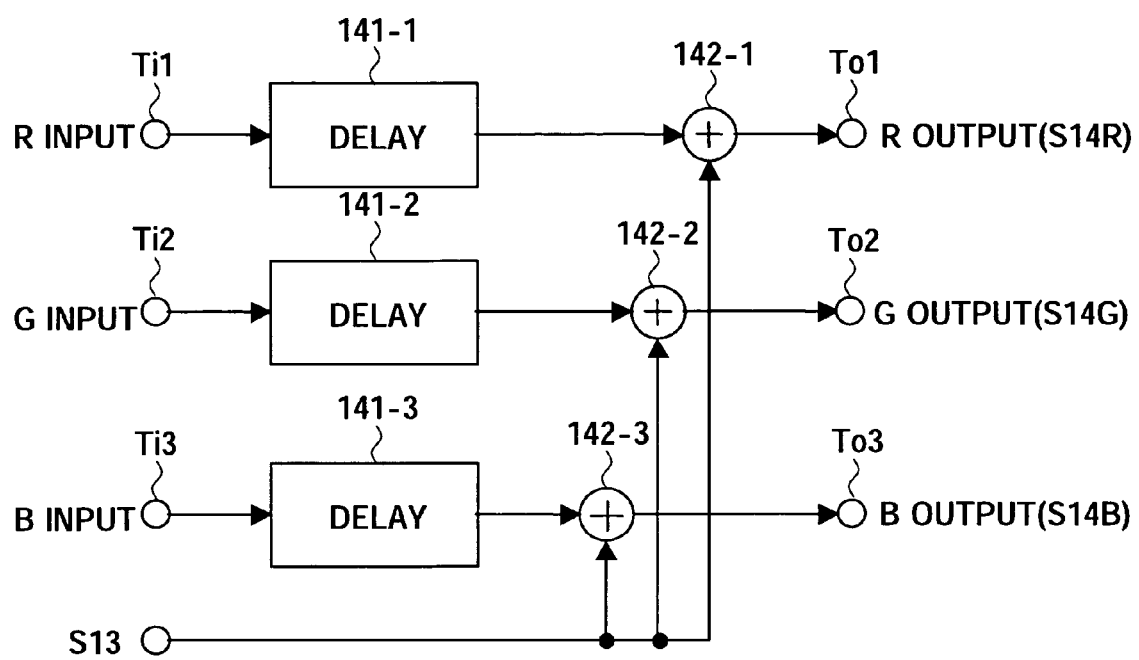
FIG. 6 is a view of the configuration of a contour correction portion.

FIG. 6 shows the configuration of the contour correction portion 14.

The contour correction portion 14 comprises three delay portions 141-1, 141-2 and 141-3 each having a predetermined delay amount, and three adders 142-1, 142-2 and 142-3. The delay portions 141-1 to 141-3 are to be input an RGB signal (R signal, G signal and B signal) from the input terminals Ti1 to Ti3 shown in FIG. 1. An input of one side of each of the adders 142-1 to 142-3 is connected to each of outputs of the delay portions 141-1 to 141-3. Also, an input of the other side of each of the adders 142-1 to 142-3 is to be supplied a contour correction signal S13 from the correction signal generation portion 13 shown in FIG. 5. Outputs of the adders 142-1 to 142-3 are connected to the output terminals To1 to To3, and an RGB signal S14 after contour enhancement correction is output from these output terminals and supplied to a not shown other processing circuit and display portion.

The contour correction portion 14 is configured to operate in synchronization with vertical and horizontal synchronization signals. Also, the delay portions 141-1 to 141-3 have the same delay amount, and the value is determined in accordance with a signal delay amount by all of the luminance signal generation circuit 11, the correction amount setting portion 12 and the correction signal generation portion 13. As a result, when a contour correction signal S13 is input to the other side inputs of the adders 142-1 to 142-3, an RGB signal in accordance with the contour correction signal S13 is given from the delay portions 141-1 to 141-3 to inputs on one side of the adders 142-1 to 142-3.

Figure 7:
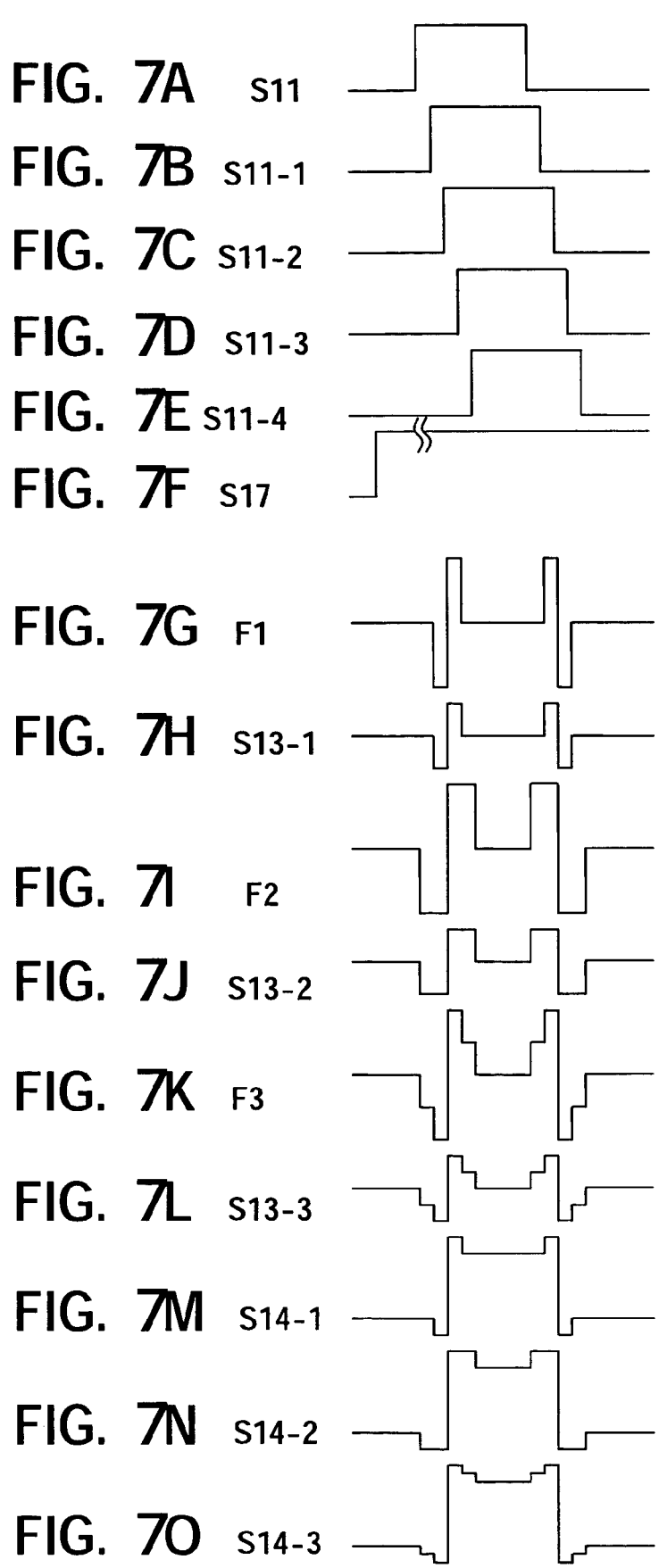
FIG. 7A to FIG. 7O are timing charts of transition of signal waveforms in processing by the correction signal generation portion and contour correction portion.

Transition of a signal waveform by the configuration shown in FIG. 5 and FIG. 6 explained above is shown in timing charts in FIG. 7.

FIG. 7A is a schematic view of an outline waveform of a luminance signal S11 input to the delay portion 134-1 shown in FIG. 5. When the luminance signal S11 is input successively to the delay portions 134-1 to 134-4, the delay portion 134-1 outputs a luminance signal S11-1 after being delayed once shown in FIG. 7B, the delay portion 134-2 outputs a luminance signal S11-2 after being delayed twice shown in FIG. 7C, the delay portion 134-3 outputs a luminance signal S11-3 after being delayed for three times shown in FIG. 7D, and the delay portion 134-4 outputs a luminance signal S11-4 after being delayed once shown in FIG. 7E.

Also, FIG. 7F shows a waveform of a contour enhancement gain signal S17 after time-depending smoothing input to the multiplier 133 shown in FIG. 5. The contour enhancement gain signal S17 is a signal which is already risen by a vertical synchronization signal before the input of the luminance signal shown in FIG. 7A to FIG. 7E and maintains a constant DC level at the time of filter processing. The DC level of the contour enhancement gain signal S17 has a value of, for example, 1 or less in accordance with the maximum luminance difference. Here, the case where the DC level of the contour enhancement gain signal S17 is "0.5" is explained.

The first filter output F1 explained above is a signal obtained by weighing respective coefficients "−1.0", "+2.0" and "−1.0" on three luminance signals S11-l, S11-2 and S11-3 having a delay interval of an amount of one pixel and adding, so that it is generated as a signal for sharpening in a range of one pixel to the left and to the right of an edge as shown in FIG. 7G. The first filter output F1 is subjected to gain adjustment to be 0.5 times by the multiplier 133, and a contour correction signal S13-1 corresponding to the first filter characteristic shown in FIG. 7H is generated.

The second filter output F2 explained above is a signal obtained by weighing respective coefficients "−1.0", "+2.0" and "−1.0" on three luminance signals S11-0, S11-2 and S11-4 having a delay interval of an amount of two pixels and adding, so that it is generated as a signal for sharpening in a range of two pixels to the left and to the right of an edge as shown in FIG. 7I. The second filter output F2 is subjected to gain adjustment to be 0.5 times by the multiplier 133, and a contour correction signal S13-2 corresponding to the second filter characteristic shown in FIG. 7J is generated.

The third filter output F3 explained above is a signal obtained by weighing respective coefficients "−1.0", "−1.0", "+2.0", "−1.0" and "−1.0" on five luminance signals S11-0, S11-1, S11-2, S11-3 and S11-4 having a delay interval of an amount of one pixel, adding, and being subjected to gain adjustment to be "−0.5" times, so that it is generated as a signal for sharpening differently for each pixel in a range of two pixels to the left and to the right of an edge as shown in FIG. 7K. The third filter output F3 is different from other filter outputs F1 and F2 and is obtained by adding five luminance signals and has a relatively high level, so that it is subjected to gain adjustment by a suitable magnification, such as "−0.5", by the multiplier 137. The third filter output F3 is furthermore subjected to gain adjustment to be 0.5 times by the multiplier 133, and a contour correction signal S13-3 corresponding to the third filter characteristic shown in FIG. 7L is generated.

As explained above, since the selection circuit 132 selects any one of the first to third filter outputs F1 to F3, one of the three contour correction signals S13-1 to S13-3 is generated and supplied to the contour correction portion 14.

As explained above, the contour correction portion 14 shown in FIG. 6 performs the same operation for a system of each color of an RGB signal. FIG. 7M to FIG. 7O show wavelengths of an RGB signal after contour correction, and the wavelengths are generalized waveforms in common with the respective colors.

A signal S14-1 after contour correction shown in FIG. 7M is a signal obtained by adding an original input image signal, from which the luminance signal S11 shown in FIG. 7A is extracted, to the contour correction signal S13-1 of the first filter characteristic shown in FIG. 7H. Similarly, the signal S14-2 after contour correction shown in FIG. 7N is obtained by adding an input original signal to the contour correction signal S13-2 of the second filter characteristic shown in FIG. 7J. Also, the signal S14-3 after contour correction shown in FIG. 7O is obtained by adding an input original signal to the contour correction signal S13-3 of the third filter characteristic shown in FIG. 7L. The adding of these signals is performed in the adders 142-1 to 142-3 shown in FIG. 6. By optimizing a delay amount of the input image signal by the delay portions 141-1 to 141-3 before that, accurate synchronization between signals can be attained.

Next, modified examples of the present embodiment will be explained.

A part of the configuration shown in FIG. 1 can be performed by a function on a program executed by a microcomputer (μC).

Figure 8:
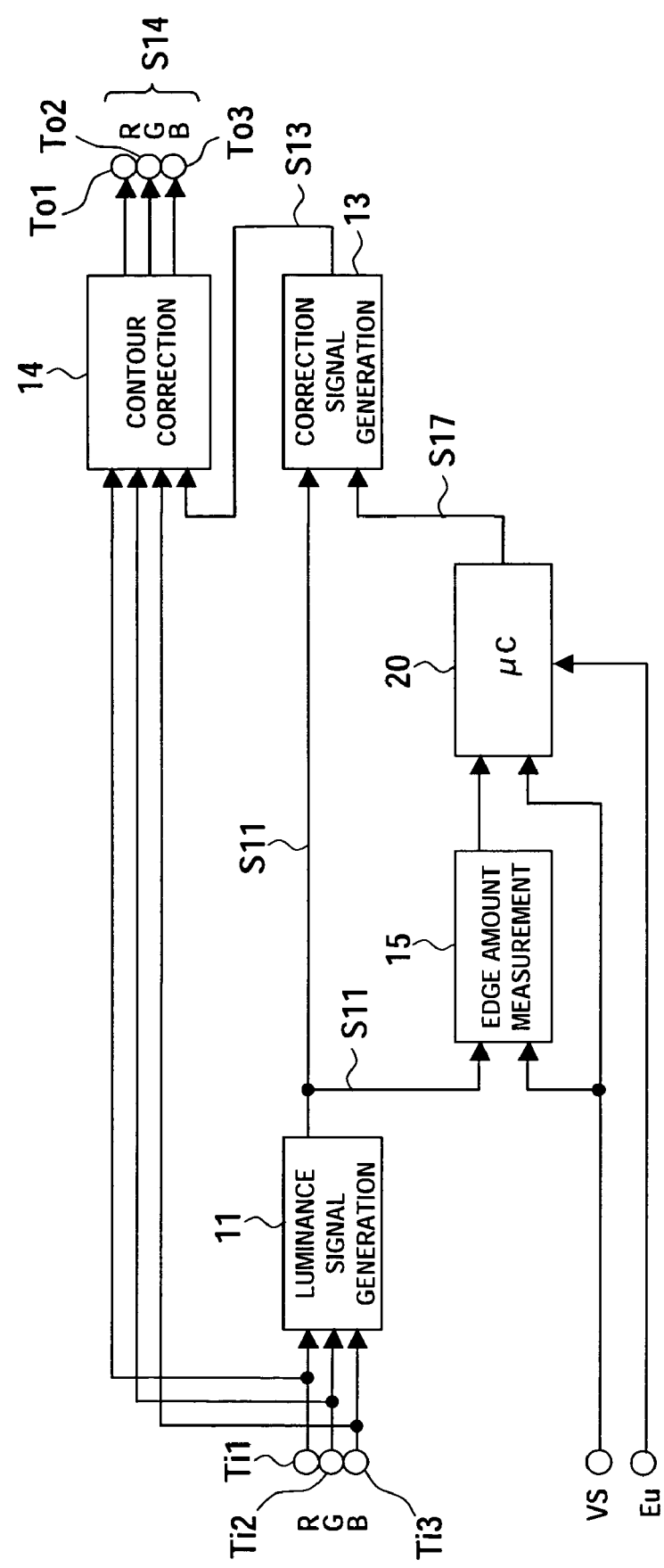
FIG. 8 is a view of the configuration when a function of the correction amount conversion portion and time-depending smooth portion is executed on software.

FIG. 8 is a view of the configuration when a function of the correction amount conversion portion 16 and the time-depending smooth portion 17 shown in FIG. 1 is executed by a microcomputer (μC) 20.

By connecting a vertical synchronization signal VS to an interrupting port of the microcomputer 20, calculation software shown in [Table 1] below is executed every time a vertical synchronization pulse interrupts.

TABLE 1 measure 1 = measure 0
measure 0 = detection value of maximum luminance difference
measure = (measure 0 + measure 1)/2
emphasis = function(measure)

Here, "measure 0" is a detection value of the maximum luminance difference, and after copying this to "measure 1", the detection value of the maximum luminance difference of the current frame is read from the edge amount detection portion 15 and stored in the "measure 0". After obtaining an average of "measure 0" and "measure 1", an enhancement amount "emphasis" is calculated by a function "function (measure)" using the detection value "measure" as a parameter. Time-depending smooth processing is executed based on the average of detection values, and correction amount conversion processing is performed by the function "function(measure)" processing. An output after the function processing is output as a contour enhancement gain signal S17 to the correction signal generation portion 13.

Figure 9:
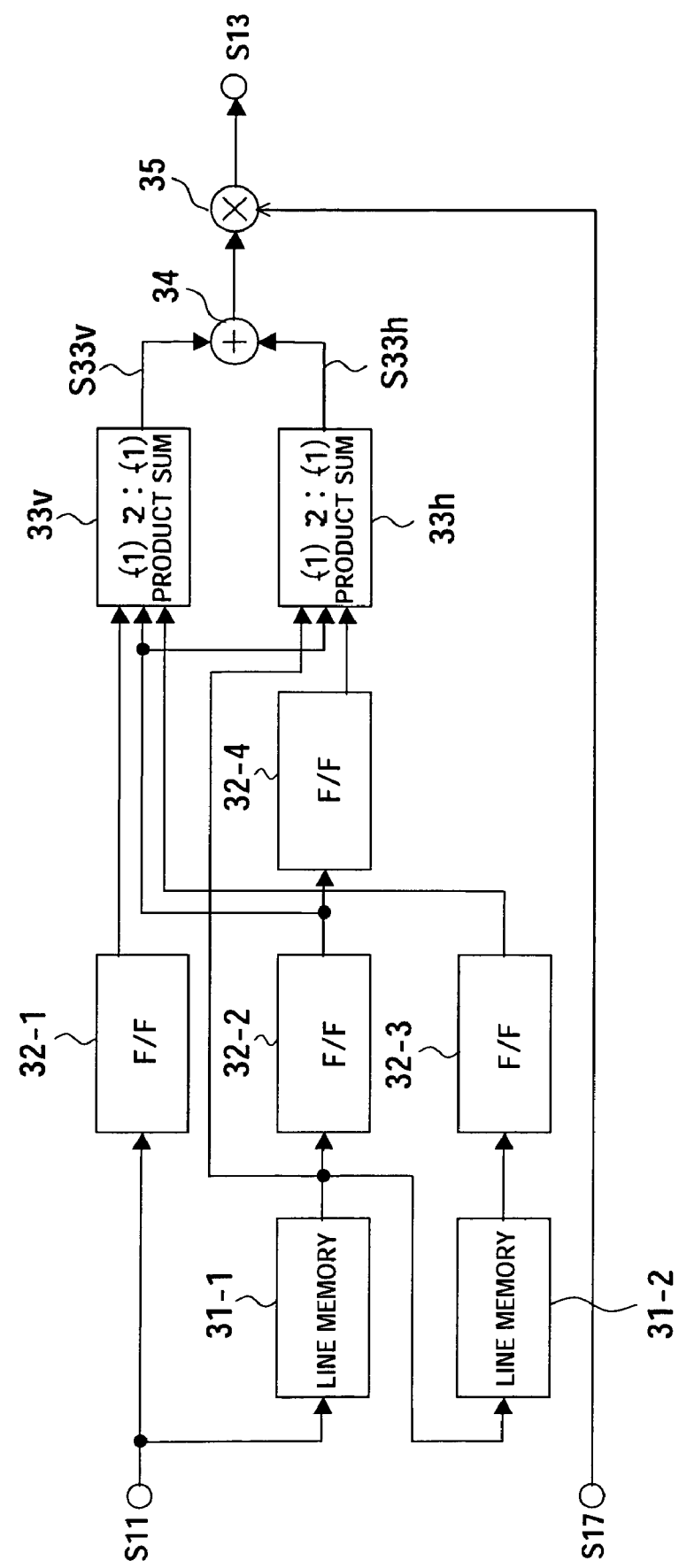
FIG. 9 is a view of the configuration of a correction signal generation portion when extracting edge information both vertically and horizontally to generate a contour correction signal.

FIG. 9 is a view of the configuration of the correction signal generation portion when extracting edge information both vertically and horizontally and generating the contour correction signal S13.

The case of delaying a luminance signal in the horizontal direction and extracting edge information by a sharpening filter in the horizontal direction (refer to FIG. 5) was explained above. However, the edge information can be extracted also in the vertical direction. Thus, FIG. 9 shows an example of improving accuracy of edge information by extracting edge information both vertically and horizontally and adding the two.

A correction signal generation portion 13A shown in FIG. 9 comprises two line memories 31-1 and 31-2, four flip-flops (F/F) 32-1 to 32-4, a vertical direction filter calculation portion 33v, a horizontal direction filter calculation portion 33h, an adder 34 and a multiplier 35.

A luminance signal S11 is input to the line memory 31-1 and the F/F 32-1. The F/F 32-1 generates a luminance signal S11-01 delayed exactly by one pixel. The line memory 31-1 and the F/F 32-2 are serially connected, and a luminance signal S11-11 delayed exactly by one line and one pixel is generated from an output of the F/F 32-2. Furthermore, the line memories 31-1 and 31-2 and the F/F 32-3 are serially connected, and a luminance signal S11-21 delayed exactly by two lines and one pixel is generated from an output of the F/F 32-3. The generated three luminance signals S11-01, S11-11 and S11-21 provide luminance information of three pixels aligned in the vertical direction when displaying. The luminance signals S11-01, S11-11 and S11-21 are input to the filter calculation portion 33v in the vertical direction, where weighing multiplying with the respective luminance signals and adding of the results are executed. The multiplication and adding (product sum) calculation itself is the same as that in FIG. 5, and a filter coefficient set of (−1):2:(−1) is prepared by only one set here. Edge information S33v in the vertical direction is detected by the filter calculation portion 33v and supplied to the adder 34.

When the luminance signal S11 is input to the line memory 31-1, a luminance signal S11-10 delayed exactly by one line is generated from the same. Also, the line memory 31-1, the F/F 32-2 and F/F 32-4 are serially connected, a luminance signal S11-11 delayed exactly by one line and one pixel is generated at the midpoint of the line memory 31-1 and the F/F 32-2, and a luminance signal S11-12 delayed exactly by one line and two pixels is generated at the midpoint of the F/F 32-2 and the F/F 32-4. These generated three luminance signals S11-10, S11-11 and S11-12 provides luminance information on three pixels aligned in the horizontal direction when displaying. The three luminance signals S11-10, S11-11 and S11-12 are input to the horizontal direction filter calculation portion 33h, where weighing multiplying with the respective luminance signals and adding of the results are executed. The multiplication and adding (product sum) calculation itself is the same as that in FIG. 5, and a filter coefficient set of (−1):2:(−1) is prepared by only one set here. Edge information S33h in the horizontal direction is detected by the filter calculation portion 33h and supplied to the adder 34.

In the adder 34, the edge information S33v and S33h are added and multiplied with an input contour enhancement gain signal S17 in the multiplier 35. The contour enhancement gain signal S17 here is generated in the same way as the case in FIG. 1. Note that the table and function for determining a conversion characteristic of the correction amount conversion portion 16 suitable to the edge information extraction method shown in FIG. 9, furthermore, a delay amount of the time-depending smooth portion 17, etc. are optimized, consequently, supply timing and the gain value of the generated contour enhancement gain signal S17 are also suitable to the edge information extraction method shown in FIG. 9. From the multiplier 35, by considering the edge information both horizontally and vertically, a contour correction signal S13 adaptable to contour correction in two directions of the horizontal direction and the vertical direction is supplied to the contour correction portion 14 shown in FIG. 1.

Note that the contour correction portion 14 may be configured to perform contour correction in both vertical and horizontal directions or either one of the directions. Also, it may be configured to switch the detection direction of the edge information from the two directions by selecting one function of the two filter calculation portions 33v and 33h shown in FIG. 9 and to detect edge information in only one of the horizontal and vertical directions. In accordance with this, direction of performing contour correction by the contour correction portion 14 may be switched. Furthermore, the configuration of preparing a plurality of filter coefficient sets in the same way as in FIG. 5, and selecting them in accordance with a user operation or detection information, such as the maximum luminance difference, may be also applied.

In the above explanation, the edge amount detection portion 15 has the configuration of being provided with a peak-hold function, and holding the maximum luminance value thereby. The present invention is not limited to this configuration. Namely, it is not always necessary to detect the maximum luminance value, and it is sufficient if a frequency range including the maximum luminance value (hereinafter, referred to as "an upper limit range" for convenience) can be detected. Since the upper limit range of the frequency band is in accordance with a type and frequency band of an input image signal, the same control as that in the case of using the peak value as explained above can be attained when a measured luminance difference is converted to a contour correction amount in accordance with the upper limit range.

Figure 10:
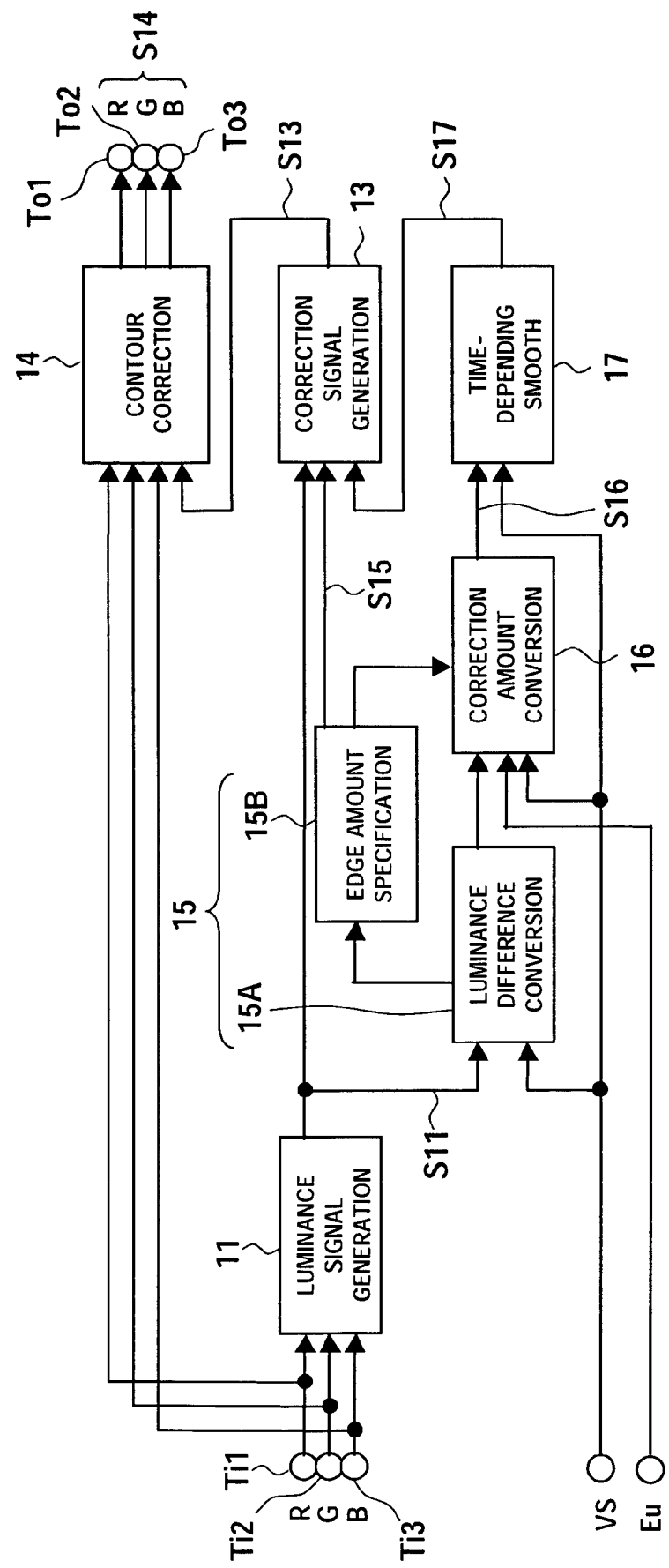
FIG. 10 is a view of the configuration of a signal processing apparatus when detecting and storing an upper limit range.

FIG. 10 is a view of the overall configuration of the case of detecting and holding the upper limit range. The configuration shown in FIG. 10 is different from that in FIG. 1 in the configuration of the edge amount detection portion 15. The edge amount detection portion 15 shown in FIG. 10 comprises a luminance difference conversion portion 15A for converting an input luminance signal S11 to an absolute value of an amount of a luminance difference of a pair of adjacent pixels or pixels over predetermined number of pixels, and an edge amount specifying portion 15B for comparing a luminance difference detected by the luminance difference conversion portion 15A and successively input with a threshold value and specifying the upper limit range of the frequency band based on the comparison result. The "edge amount" here means the upper limit range of a frequency band.

The edge amount specifying portion 15B supplies the upper limit range as an edge amount to the correction amount conversion portion 16. The correction amount conversion portion 16 converts the luminance difference input successively from the luminance difference conversion portion 15A to a contour correction amount by a conversion characteristic in accordance with the upper limit range. A function of the correction amount conversion portion 16 shown in FIG. 10 itself is the same as that in the case in FIG. 1, but the control parameter is changed from the peak value (the maximum luminance difference) to the upper range limit.

Furthermore, there are some methods of comparing and judging an amount of luminance difference performed by the edge amount specifying portion 15B. Here, a first method of using a plurality of thresholds and a second method of using one threshold and repeating comparison while changing the threshold will be explained in detail below. Note that an explanation here is made on a specific example by hardware control, but there are other means for realizing the comparing and judging method of a luminance difference amount and the present invention is not limited to this example.

In the first method, in the edge amount specifying portion 15B, a plurality of thresholds are discretely set as reference values for detecting a distribution of absolute values of luminance difference amounts of one frame. Intervals and the number of the thresholds are set by a designer and cannot be changed here, but it may be configured changeable. A method of setting may be any, but generally, either of the case of setting at constant pitches in unit of absolute value of luminance difference amount and the case of setting in unit of constant ratio with respect to a dynamic range can be applied. Here, it is assumed that about 10 thresholds at maximum are set every 10% of a dynamic range of a luminance difference.

While not particularly illustrated, the edge amount specifying portion 15B comprises about 10 comparators at maximum, wherein a predetermined threshold is input to an input on one side, and absolute values of luminance difference amounts are successively input from an input on the other side from the luminance difference conversion portion 15A. Thresholds of the comparators are set to corresponding values to 10%, 20%, 30%, . . . of the dynamic range at 10% intervals. The number of luminance difference amounts exceeding (or equivalent to) the threshold is counted at a time by the comparators. The edge amount specifying portion 15B further comprises a register for holding the counted values up to 10 for each threshold. The counted values are input from the comparators by the number of 10 at maximum and stored in the register.

When comparison of amounts and storage of the counted values to the register are finished for luminance differences by an amount of one frame, a reset operation is executed, for example, in accordance with an input of a synchronization pulse of a vertical synchronization signal VS to be input next. In a state immediately before the reset operation, a distribution (histogram) of amounts of luminance difference amounts of one frame is stored in the register. When a vertical synchronization pulse is input at this time, the maximum threshold (or a range of the luminance difference) at the time of specifying a range of the upper limit luminance difference of the histogram having at least one counted value is output as an edge amount to the correction amount conversion portion 16, then, the content stored in the register is reset.

The above operation is performed for each frame, and the maximum threshold for each frame is successively input to the correction amount conversion portion 16. The correction amount conversion portion 16 automatically sets a conversion characteristic of a slope (refer to FIG. 3) in accordance with the input maximum threshold every time the maximum threshold is input. Therefore, absolute values of luminance difference amounts to be input are successively converted to contour correction amounts S16 by the set conversion characteristic, and output to the time-depending smooth portion 17. Controlling after that is the same as that in the case in FIG. 1.

What the second method being different from the first method explained above is an operation of the edge amount specifying portion 15B. In the second method, one comparator, wherein a threshold given to an input on one side is variable, and a register for monitoring an output of the comparator and counting the number of luminance differences exceeding (or equivalent to) the threshold are provided. In this case, since a luminance difference distribution cannot be investigated only by one comparison, a luminance difference distribution is normally investigated by changing the threshold for each frame while some frames are input. Accordingly, measurement is made in unit of frames by the predetermined number equivalent to the number of variable thresholds.

The reason why such measurement on predetermined number of frames can be used is, first, because a time of displaying one frame is extremely short for a viewer. Namely, for example, when the number of threshold is 10, the luminance difference distribution does not change by 10 frames or so in normal picture in many cases, and it is extremely small in terms of probability, if any. Therefore, accurate contour correction can be performed even when a contour correction amount is set in unit of 10 frames. Also, as the second reason, the fact can be mentioned that even when the contour correction amount is set for each frame, a poor image is obtained by changing the contour enhancement degree for each frame. Therefore, response of contour correction is made slow by time-depending smoothing as shown in the example in FIG. 1.

Setting of the threshold (intervals of changes, etc.) may be set freely in the same way as in the first method, and it is assumed that the threshold changes in unit of 10% of the dynamic range below.

In this case, the threshold is set to a value equivalent to 10% of the dynamic range in the first frame, and the number of luminance difference exceeding the threshold is counted and stored in the register. While the threshold is changed to equivalent values to 20%, 30%, . . . at 10% intervals in frames after the first frame, the same processing is repeated and the register is re-written each time. During the processing, the register content is monitored. When the register content, that is, the number of luminance difference exceeding the threshold becomes zero first (or a threshold being smaller by one step), is a threshold being closest to the maximum luminance difference, so that it is detected as "the maximum threshold" corresponding to an edge amount (a range of the maximum luminance difference).

In this example, an operation of one cycle is completed by the processing on 10 frames.

At this time, the number of vertical synchronization pulse is counted to detect the final tenth frame. When it is detected to reach the tenth frame, the maximum threshold is output to the correction amount conversion portion 16 in response to an input of the next synchronization pulse, and a reset operation to restore the threshold to be the initial state is executed. After that, a data string of luminance differences to be input is considered as the first frame, and an operation of a new cycle is repeated in the same procedure as explained above.

Note that even in the case of changing the threshold in unit of 10% of the dynamic range, when it is known that the maximum value of luminance differences does not exceeds 80%, the above operation can be performed in unit of 8 frames. Also, in terms of a response time of contour enhancement, a change width of the threshold and the number of frames required in one operation cycle may be optimized.

In the first method, the number of frames required in one operation cycle, wherein the luminance correction amount can be changed, is small as one frame at minimum, so that it is suitable when improvement of the response is desired. Also, since a histogram of a luminance difference distribution can be obtained, the information can be used for other object, for example, an object of automatic selecting a filter coefficient set, etc. In FIG. 10, a signal S15 input from the edge amount specifying portion 15B to the correction signal generation portion 13 is, for example, a filter selection signal based on the histogram.

On the other hand, in the second method, one comparator and one register are sufficient, so that there is an advantage that the configuration of the edge amount specifying portion 15B can be simplified. Although the number of frames required in one operation cycle capable of changing the luminance correction amount is larger than that in the first method, there is an advantage that the time-depending smooth portion 17 shown in FIG. 1 can be omitted. It is because response is often deteriorated due to time-depending smoothing in normal contour enhancement and time-depending smoothing does not have to be performed in such a case.

Figure 11:
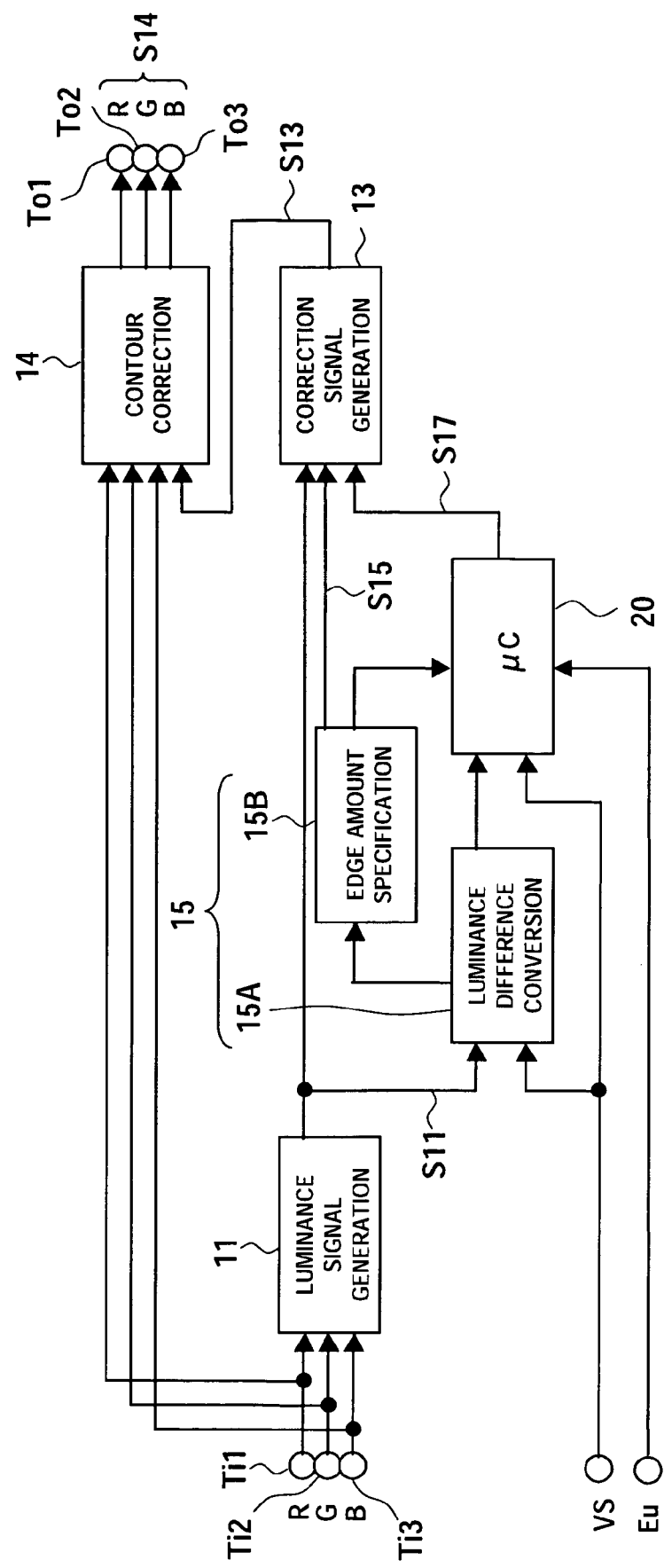
FIG. 11 is a view of the configuration of a signal processing apparatus when at least a part of a function of setting a correction amount is executed by software in the configuration shown in FIG. 10.

In the same way as shown in FIG. 8, at least a part of a function of correction amount setting can be substituted by a function on a program in a microcomputer (μC) also in the configuration shown in FIG. 10. FIG. 11 shows the configuration of that case.

The function substituted by the microcomputer 20 in FIG. 8 is a function of the correction amount conversion portion 16 and the time-depending smooth portion 17 shown in FIG. 1. This is basically the same also in FIG. 11, and a function of the correction amount conversion portion 16 and the time-depending smooth portion 17 is the same as what explained by referring to FIG. 1, so that the explanation will be omitted here. Note that in the case of FIG. 11, the edge amount specifying portion 15B is composed of a comparator and a register as hardware, so that their functions can be realized easily by software. Also, a microcomputer normally comprises therein a register for storing data, so that the function of the edge amount specifying portion 15B can be also taken into the microcomputer 20. In that case, very simple configuration can be attained as hardware.

In an explanation of FIG. 5, an operation that the selection circuit 132 selects a filter output was performed by an operation by a user, etc. This is because even when the maximum luminance difference is the same, a way of enhancing an edge should be changed when a type of a signal and brightness of the entire screen are different in some cases. However, setting option only by a user operation may cause the case where an effect of contour correction is not fully utilized if the burden of operation annoys the user and the user does not operate. As one countermeasure thereto, there is a method of automatically selecting a filter coefficient set (or a filter output) from information of the above explained histogram.

Furthermore, a method of obtaining an average luminance level (APL) of the screen may be applied as other countermeasure. Hereinafter, an example of this method will be explained. This method can be carried out by adding a function of measuring an average luminance in any of the cases in FIG. 1, FIG. 8, FIG. 10 and FIG. 11. Here, the case of adding the function to the case of FIG., 1 and FIG. 8 will be explained.

Figure 12:
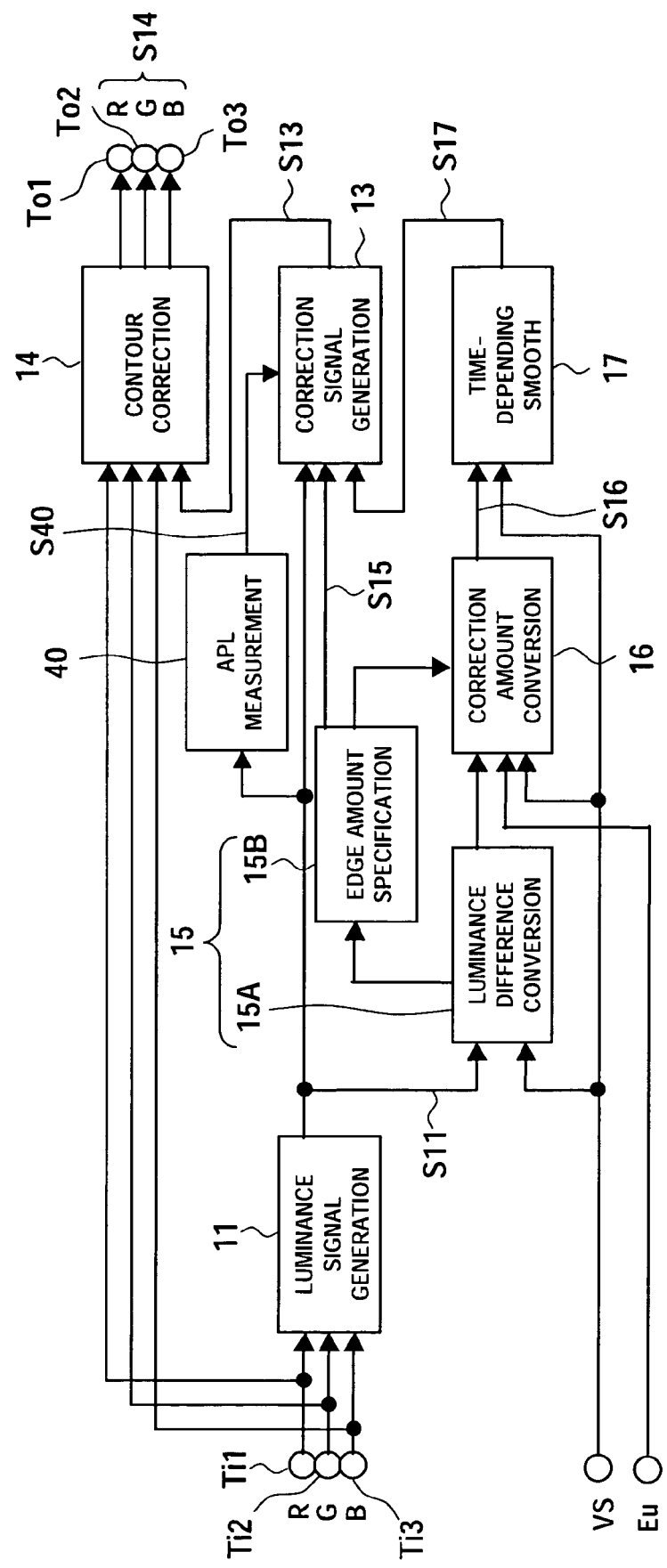
FIG. 12 is a view of the configuration of a signal processing apparatus wherein an APL measuring portion is added to the configuration shown in FIG. 10.
Figure 13:
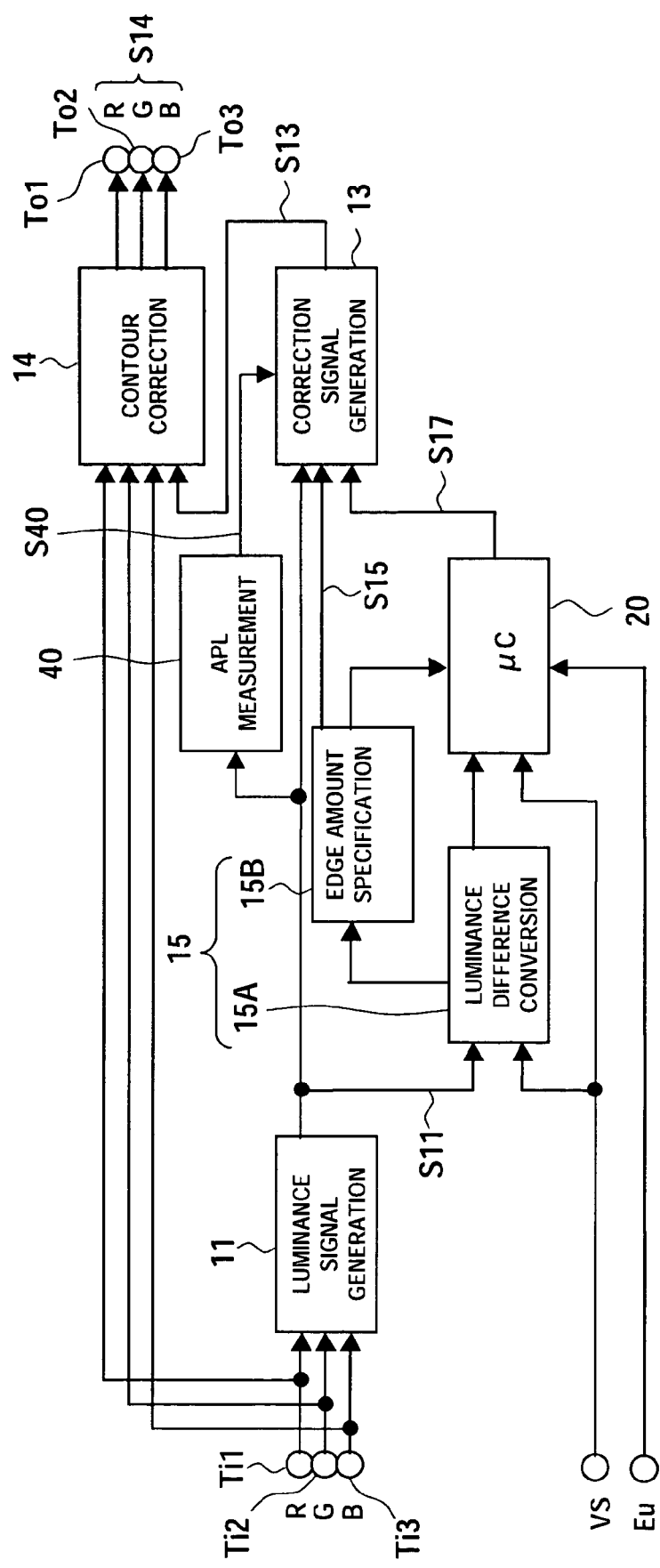
FIG. 13 is a view of the configuration of a signal processing apparatus wherein an APL measuring portion is added to the configuration shown in FIG. 11.

FIG. 12 and FIG. 13 are views of the configuration of adding an APL measuring portion to FIG. 10 and FIG. 11.

An APL measuring portion 40 measures an average luminance level (APL) per one pixel by executing multiplication of luminance levels of a luminance signal S11 generated by the luminance signal generation circuit 11, for example, over one frame, and dividing the value by the number of pixels. The APL value S40 is output to the correction signal generation portion 13.

In the correction signal generation portion 13, it is possible to choose three kinds of sharpening filters (filter outputs F1 to F3) for different ways of extracting edge information in the example shown in FIG. 5 explained above. Based on the APL value S40 input from the APL measuring portion 40 and a signal S15 of the histogram (or the maximum threshold value), etc. input from the edge amount specifying portion 15B, the correction signal generation portion 13 uses them as parameters to switch the selection circuit 132 (refer to FIG. 5) and determines as a result thereof a sharpening filter capable of performing optimal edge extraction.

Below, an operation will be explained by dividing to two cases. Note that a designer can freely set specification of how to perform edge extraction based on the APL value S40 and signal S15, that is, filter characteristics to be prepared and standard of choosing the same.

First, the case where the APL value S40 is relatively low and the frequency band of a video signal from the signal S15 is relatively low will be explained. In this case, it is judged that a dark picture as a whole with a low frequency band and being unclear is input. To raise an example, a picture of night, etc. with an SD specification corresponds to this. Therefore, it is necessary to emphasize the contour and, for example, a sharpening filter output F1 having the highest frequency is selected by the selection circuit 132. Also, it is determined that the frequency at this time is low, so that a conversion characteristic capable of outputting a higher contour correction amount is set even when the luminance difference is the same in the correction amount conversion portion 16, therefore, a gain of the contour correction signal S13 is set high. As a result, a picture after the contour correction is corrected to a picture, wherein a luminance change amount at the contour portion is relatively large and sharp enhancement is performed.

Next, the case where the APL value S40 is relatively low but the frequency band of a video signal from the signal S15 is relatively high will be explained. In this case, it is judged that an entirely dark picture with a high frequency band is input. To raise a specific example, a picture of night, etc. with an HD specification corresponds to this. At this time, the picture itself is dark but the resolution is originally high, so that a gain of contour enhancement is suppressed or contour enhancement is nearly unnecessary in many cases. Note that when a filter with a high frequency is selected, the edge may be emphasized more than necessary in some cases when the gain is temporarily increased at the time of switching scenes, etc. Therefore, it is preferable to select a filter characteristic of not making the edge sharp. Accordingly, the selection circuit 132 selects a sharpening filter output F2 with a low frequency. At this time, since the frequency band is determined to be high, conversion characteristic capable of outputting a lower contour correction amount is set even if the luminance difference is the same in the correction amount conversion portion 16, so that the gain of the contour correction signal S13 is set low. As a result, a picture after the contour correction is corrected to a picture, wherein contour enhancement is not performed or a luminance change amount at the contour portion is relatively small even contour enhancement is performed, and contour enhancement with a contour having a wide width without sharpness is performed.

Note that in the explanation on a conversion characteristic shown in FIG. 3, a user set a contour correction amount to a center value of the dynamic range. This setting value is set, for example, as a contour enhancement item on a menu screen of the display apparatus, and can be correspond to a function of heightening and lowering the entire level of a contour enhancement amount in accordance with preferences. In this case, when nothing is changed, the contour correction amount is set to the center value of the dynamic range as a default value.

Note that control by the lower limit value and the upper limit value can be considered as the setting method. Namely, when the maximum value is set, the dynamic range of a contour correction amount is set to the maximum value or smaller, and a conversion characteristic is determined, so that the change rate of a correction amount with respect to a luminance difference becomes variable in accordance with the maximum luminance difference and other edge amount detection result. Also, when the minimum value is set, the dynamic range of a contour correction amount is set to not less than the minimum value, and a conversion characteristic is determined, so that the change rate of a correction amount with respect to a luminance difference becomes variable in accordance with the edge amount detection result.

According to the embodiments of the present invention explained above, effects below can be obtained.

First, an edge amount is detected in accordance with a frequency dynamic range of an input source (an input image signal), and a contour enhancement gain is set in accordance with the edge amount. The edge amount is the maximum luminance difference in any number of frames of one or more, or a frequency range including the maximum luminance difference (or a threshold of the boundary). Therefore, a contour enhancement gain can be precisely controlled in accordance with whether the input source is a broad band signal or a narrow band signal, furthermore, whether the intermediate band of them is included. As a result, even in the case where a display portion with high resolution is provided, but a signal obtained by performing enlargement scaling on a narrow band signal with lower resolution than the specification is sometimes input and a type of the signal cannot be recognized by its input terminal, etc., optimal contour enhancement is possible in accordance with the frequency band of the input source. Also, even on a screen including a portion with a large luminance difference, such as a character, the character edge does not become harsh.

Secondary, as a result that a contour enhancement gain can be switched in unit of predetermined number of frames and the number of the frames is controlled, time response of contour enhancement can be optimized. Accordingly, even in the case where picture scenes are frequently switched, unstable displaying, wherein a contour enhancement amount changes more than necessary, can be effectively prevented. Also, when a time-depending smooth portion is provided, the time response of contour enhancement can be optimized independently from the number of frames. Furthermore, a generated contour correction signal is generated at timing in accordance with a horizontal or vertical synchronization signal and input to a contour correction portion, so that it is easy to attain synchronization timing with an input image signal.

Thirdly, extraction of edge information for generating a correction signal for contour enhancement can be set separately from a contour enhancement gain, optimization of a clear screen is easy. Also, when an edge amount to be detected is a frequency range including the maximum luminance difference, a histogram of a luminance difference distribution is obtained, and the information can be used as one of basic information at the time of selecting a sharpening filter characteristic for extracting edge information. Furthermore, when a function of measuring an average luminance level is provided, and the average luminance level and luminance difference distribution information, such as a histogram, are combined, selection of a sharpening filter characteristic itself can be automated. Particularly, even in the case of a picture including characters on a part but having a little luminance difference on other part, a filter characteristic suitable to such an image can be selected.

As explained above, by applying the present invention, an optimal filter characteristic can be automatically selected in accordance with brightness of the entire screen and a rate of including a region having large luminance difference (the third effect), by combining this, optimization of the above contour enhancement gain (the first effect) and, furthermore, optimization of time response (the second effect), dynamic contour correction can be performed on images of all input sources to obtain a clear image corresponding to a type and resolution of the signal at suitable timing, and a signal processing apparatus and an image display apparatus not requiring any manual adjustment can be realized.

The embodiments explained above are for easier understanding of the present invention and not to limit the present invention. Accordingly, respective elements disclosed in the above embodiments includes all modifications in designs and equivalents belonging to the technical field of the present invention.

What is claimed is:

1. A signal processing apparatus for correcting a contour of an image, comprising:
   an edge amount detection portion for generating a data string of luminance differences of a pair of pixels adjacent to each other or adjacent over some pixels in predetermined number of frames composing the image, and detecting a maximum luminance difference from the data string and storing the same;
   a correction amount conversion portion for converting the luminance differences of the data string to a contour correction amount based on the maximum luminance difference;

a correction signal generation portion for generating a contour correction signal while changing a gain in accordance with the contour correction amount; and a contour correction portion for adding the input contour correction signal to an image signal by synchronizing, and correcting a contour of the image.

2. A signal processing apparatus as set forth in claim 1, wherein said correction amount conversion portion converts the luminance differences of the data string to a contour correction amount based on the stored maximum luminance difference every time when a number of synchronization pulse reaches a predetermined number.

3. A signal processing apparatus as set forth in claim 1, wherein
a sharpening filter for extracting edge information of the image in said correction signal generation portion, and an average luminance measuring portion for measuring an average luminance level in the predetermined number of frames are provided; and
a filter coefficient of the sharpening filter is changed based on the average luminance level.

4. A signal processing apparatus for correcting a contour of an image, comprising:
an edge amount detection portion for generating a data string of luminance differences of a pair of pixels adjacent to each other or adjacent over some pixels from an image, comparing the luminance differences with a plurality of reference values, and detecting a range including a maximum luminance difference for every predetermined number of frames;
a correction amount conversion portion for converting the luminance differences of the data string to a contour correction amount based on the detected range;
a correction signal generation portion for generating a contour correction signal while changing a gain in accordance with the contour correction amount; and
a contour correction portion for adding the input contour correction signal to an image signal by synchronizing, and correcting a contour of the image.

5. A signal processing apparatus as set forth in claim 4, wherein:
said correction amount conversion portion compares said luminance differences of the pixel pair with the plurality of reference values and stores numbers of luminance difference in a plurality of luminance difference ranges divided by the plurality of reference values in accordance with the comparison results, and
said correction amount conversion portion converts the luminance differences of the data string to a contour correction amount based on a maximum difference range among the plurality of luminance difference ranges storing luminance differences every time when a number of synchronization pulse reaches a predetermined number.

6. A signal processing apparatus as set forth in claim 4, wherein
a sharpening filter for extracting edge information of the image in said correction signal generation portion, and an average luminance measuring portion for measuring an average luminance level in the predetermined number of frames are provided; and
a filter coefficient of the sharpening filter is changed based on the average luminance level.

7. A signal processing apparatus for correcting a contour of an image, comprising:
an edge amount detection portion for generating a data string of luminance differences of a pair of pixels adjacent to each other or adjacent over some pixels in predetermined number of frames composing the image, comparing the luminance differences with a predetermined reference value, counting a number of luminance difference exceeding the predetermined reference value, and detecting a reference value close to a maximum luminance difference by repeating said comparison and counting while changing the predetermined reference value;
a correction amount conversion portion for converting the luminance differences of the data string to a contour correction amount based on the detected reference value;
a correction signal generation portion for generating a contour correction signal while changing a gain in accordance with the contour correction amount; and
a contour correction portion for adding the input contour correction signal to an image signal by synchronizing, and correcting a contour of the image.

8. A signal processing apparatus as set forth in claim 7, wherein:
said correction amount conversion portion compares said luminance differences of the pixel pair with the predetermined reference value and repeats the comparison until the number of luminance difference exceeding the predetermined reference value becomes zero while gradually heightening the predetermined reference value, and
said correction amount conversion portion converts the luminance differences of the data string to a contour correction amount based on a reference value when the number of luminance difference exceeding the predetermined reference value becomes zero every time when a number of synchronization pulse reaches a predetermined number.

9. A signal processing apparatus as set forth in claim 7, wherein
a sharpening filter for extracting edge information of the image in said correction signal generation portion, and an average luminance measuring portion for measuring an average luminance level in the predetermined number of frames are provided; and
a filter coefficient of the sharpening filter is changed based on the average luminance level.

10. An image display apparatus for correcting a contour of an image by a signal processing circuit and sending to a display portion, wherein:
the signal processing circuit comprises
an edge amount detection portion for generating a data string of luminance differences of a pair of pixels adjacent to each other or adjacent over some pixels in predetermined number of frames composing the image, and detecting a maximum luminance difference from the data string and storing the same;
a correction amount conversion portion for converting the luminance differences of the data string to a contour correction amount based on the maximum luminance difference;
a correction signal generation portion for generating a contour correction signal while changing a gain in accordance with the contour correction amount; and
a contour correction portion for adding the input contour correction signal to an image signal by synchronizing, and correcting a contour of the image.

11. An image display apparatus for correcting a contour of an image by a signal processing circuit and sending to a display portion, wherein:

the signal processing circuit comprises
- an edge amount detection portion for generating a data string of luminance differences of a pair of pixels adjacent to each other or adjacent over some pixels from the image, comparing the luminance differences with a plurality of reference values, and detecting a range including a maximum luminance difference for every predetermined number of frames;
- a correction amount conversion portion for converting the luminance differences of the data string to a contour correction amount based on the detected range;
- a correction signal generation portion for generating a contour correction signal while changing a gain in accordance with the contour correction amount; and
- a contour correction portion for adding the input contour correction signal to an image signal by synchronizing, and correcting a contour of the image.

12. An image display apparatus for correcting a contour of an image by a signal processing circuit and sending to a display portion, wherein:

the signal processing circuit comprises
- an edge amount detection portion for generating a data string of luminance differences of a pair of pixels adjacent to each other or adjacent over some pixels in predetermined number of frames composing the image, comparing the luminance differences with a predetermined reference value, counting a number of luminance difference exceeding the predetermined reference value, and detecting a reference value close to a maximum luminance difference by repeating the comparison and counting while changing the predetermined reference value;
- a correction amount conversion portion for converting the luminance differences of the data string to a contour correction amount based on the detected reference value;
- a correction signal generation portion for generating a contour correction signal while changing a gain in accordance with the contour correction amount; and
- a contour correction portion for adding the input contour correction signal to an image signal by synchronizing, and correcting a contour of the image.

13. A signal processing method for correcting a contour of an image, including:
- a luminance difference generation step for generating a data string of luminance differences of a pair of pixels adjacent to each other or adjacent over some pixels in predetermined number of frames composing the image;
- an edge amount detection step for detecting a maximum luminance difference from the data string and storing the same;
- a correction amount conversion step for converting the luminance differences of the data string to a contour correction amount based on the maximum luminance difference;
- a correction signal generation step for generating a contour correction signal while changing a gain in accordance with the contour correction amount; and
- a contour correction step for adding the input contour correction signal to an image signal by synchronizing, and correcting a contour of the image.

14. A signal processing method for correcting a contour of an image, including:
- a luminance difference generation step for generating a data string of luminance differences of a pair of pixels adjacent to each other or adjacent over some pixels from the image;
- an edge amount detection step for comparing the luminance differences with a plurality of reference values, and detecting a range including a maximum luminance difference for every predetermined number of frames;
- a correction amount conversion step for converting the luminance differences of the data string to a contour correction amount based on the detected range;
- a correction signal generation step for generating a contour correction signal while changing a gain in accordance with the contour correction amount; and
- a contour correction step for adding the input contour correction signal to an image signal by synchronizing, and correcting a contour of the image.

15. A signal processing method for correcting a contour of an image, including:
- a luminance difference generation step for generating a data string of luminance differences of a pair of pixels adjacent to each other or adjacent over some pixels in predetermined number of frames composing the image,
- an edge amount detection step for comparing the luminance differences with a predetermined reference value, counting a number of luminance difference exceeding the predetermined reference value, and detecting a reference value close to a maximum luminance difference by repeating the comparison and counting while changing the predetermined reference value;
- a correction amount conversion step for converting the luminance differences of the data string to a contour correction amount based on the detected reference value;
- a correction signal generation step for generating a contour correction signal while changing a gain in accordance with the contour correction amount; and
- a contour correction step for adding the input contour correction signal to an image signal by synchronizing, and correcting a contour of the image.

* * * * *